US012583048B2

(12) United States Patent
Feldhausen

(10) Patent No.: US 12,583,048 B2
(45) Date of Patent: Mar. 24, 2026

(54) METHODS AND APPARATUS TO CONVERT WELDING-TYPE POWER TO WELDING-TYPE POWER AND RESISTIVE PREHEATING POWER

(71) Applicant: Illinois Tool Works Inc., Glenview, IL (US)

(72) Inventor: Joseph Feldhausen, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 446 days.

(21) Appl. No.: 16/811,540

(22) Filed: Mar. 6, 2020

(65) Prior Publication Data

US 2020/0306863 A1 Oct. 1, 2020

Related U.S. Application Data

(60) Provisional application No. 62/826,320, filed on Mar. 29, 2019.

(51) Int. Cl.
*B23K 9/10* (2006.01)
*B23K 9/235* (2006.01)

(52) U.S. Cl.
CPC ............ *B23K 9/1012* (2013.01); *B23K 9/235* (2013.01)

(58) Field of Classification Search
CPC .. B23K 9/1006; B23K 9/1012; B23K 9/1093; B23K 9/235; B23K 9/10; B23K 9/32; B23K 9/124; H02M 7/217; H02M 3/33592; H02M 3/3376
USPC ........... 219/130, 86, 137, 136, 133; 206/723
See application file for complete search history.

(56) References Cited

U.S. PATENT DOCUMENTS

| | | | |
|---|---|---|---|
| 2,365,958 | A | 12/1944 | Holslag |
| 2,416,047 | A | 2/1947 | Dolan |
| 2,976,462 | A | 3/1961 | Miller |
| 3,030,495 | A | 4/1962 | Anderson |
| 3,288,982 | A | 11/1966 | Haruyoshi |
| 3,549,857 | A | 12/1970 | Carter |
| 3,573,550 | A | 4/1971 | Baker, Jr. |
| 3,725,629 | A | 4/1973 | Vickers |

(Continued)

FOREIGN PATENT DOCUMENTS

| | | |
|---|---|---|
| AT | 413801 | 6/2006 |
| CA | 2072711 | 12/1992 |

(Continued)

OTHER PUBLICATIONS

Machine translation of KR-20180032079: Roh, Welding equipment and available welding and preheat parallel operations, 2018 (Year: 2018).*

(Continued)

*Primary Examiner* — Vy T Nguyen
*Assistant Examiner* — Abigail H Rhue
(74) *Attorney, Agent, or Firm* — McAndrews, Held & Malloy, Ltd.

(57) ABSTRACT

An example welding accessory includes: a weld input configured to receive first welding-type power; and power conversion circuitry configured to: convert a first portion of the first welding-type power to second welding-type power; output the second welding-type power to a weld circuit; convert a second portion of the first welding-type power to preheating power; and output the preheating power to a preheater.

21 Claims, 9 Drawing Sheets

(56)                     References Cited

U.S. PATENT DOCUMENTS

| | | | |
|---|---|---|---|
| 3,809,853 A | 5/1974 | Manz | |
| 3,849,871 A | 11/1974 | Kaunitz | |
| 3,912,980 A | 10/1975 | Crump | |
| 3,946,349 A | 3/1976 | Haldeman | |
| 4,160,967 A | 7/1979 | Beech | |
| 4,188,419 A | 2/1980 | Detert | |
| 4,222,023 A | 9/1980 | Beech | |
| 4,329,561 A | 5/1982 | Schafer | |
| 4,384,187 A | 5/1983 | Jackson | |
| 4,426,565 A | 1/1984 | Rueter | |
| 4,447,703 A | 5/1984 | Stol | |
| 4,467,176 A | 8/1984 | Mizuno | |
| 4,493,971 A | 1/1985 | Nawa | |
| 4,531,040 A | 7/1985 | Nawa | |
| 4,536,634 A | 8/1985 | Nawa | |
| 4,546,234 A | 10/1985 | Ogasawara | |
| 4,547,654 A | 10/1985 | Stol | |
| 4,580,026 A | 4/1986 | Stol | |
| 4,590,358 A | 5/1986 | Stol | |
| 4,614,856 A | 9/1986 | Hori | |
| 4,628,182 A | 12/1986 | Hori | |
| 4,631,385 A | 12/1986 | Rothermel | |
| 4,667,083 A | 5/1987 | Stol | |
| 4,675,494 A | 6/1987 | Dilay | |
| 4,728,761 A | 3/1988 | Mucha | |
| 4,897,523 A | 1/1990 | Parks | |
| 4,950,348 A | 8/1990 | Larsen | |
| 4,954,691 A | 9/1990 | Parks | |
| 4,973,821 A | 11/1990 | Martin | |
| 5,001,326 A | 3/1991 | Stava | |
| 5,043,557 A | 8/1991 | Tabata | |
| 5,086,207 A | 2/1992 | Deam | |
| 5,101,086 A | 3/1992 | Dion | |
| 5,118,028 A | 6/1992 | Ogawa | |
| 5,140,123 A | 8/1992 | Mitani | |
| 5,148,001 A | 9/1992 | Stava | |
| 5,208,433 A | 5/1993 | Hellegouarc | |
| 5,270,516 A | 12/1993 | Hamamoto | |
| 5,278,390 A | 1/1994 | Blankenship | |
| 5,315,089 A | 5/1994 | Hughes | |
| 5,319,179 A | 6/1994 | Joecks | |
| 5,343,023 A | 8/1994 | Geissler | |
| 5,349,156 A | 9/1994 | Madigan | |
| 5,352,871 A | 10/1994 | Ross | |
| 5,367,138 A | 11/1994 | Moss | |
| 5,412,184 A | 5/1995 | McGaffigan | |
| 5,461,215 A | 10/1995 | Haldeman | |
| 5,466,916 A | 11/1995 | Iguchi | |
| 5,504,309 A | 4/1996 | Geissler | |
| 5,521,355 A | 5/1996 | Lorentzen | |
| 5,526,561 A | 6/1996 | McGaffigan | |
| 5,644,461 A | 7/1997 | Miller | |
| 5,710,413 A | 1/1998 | King | |
| 5,714,738 A | 2/1998 | Hauschulz | |
| 5,739,506 A | 4/1998 | Hanton | |
| 5,742,029 A | 4/1998 | Stava | |
| 5,756,967 A | 5/1998 | Quinn | |
| 5,760,373 A | 6/1998 | Colling | |
| 5,773,799 A | 6/1998 | Maxfield | |
| 5,783,799 A | 7/1998 | Geissler | |
| 5,832,765 A | 11/1998 | Ohashi | |
| 5,844,193 A | 12/1998 | Nomura | |
| 5,963,022 A | 10/1999 | Buda | |
| 5,968,587 A | 10/1999 | Frankel | |
| 5,994,659 A * | 11/1999 | Offer | B23K 9/1336 |
| | | | 219/136 |
| 6,002,104 A | 12/1999 | Hsu | |
| 6,008,470 A | 12/1999 | Zhang | |
| 6,043,471 A | 3/2000 | Wiseman | |
| 6,051,810 A | 4/2000 | Stava | |
| 6,077,369 A | 6/2000 | Kusano | |
| 6,078,023 A | 6/2000 | Jones | |
| 6,090,067 A | 7/2000 | Carter | |
| 6,107,602 A | 8/2000 | Geissler | |
| 6,115,273 A | 9/2000 | Geissler | |
| 6,160,241 A | 12/2000 | Stava | |
| 6,169,263 B1 | 1/2001 | Derby | |
| 6,204,476 B1 | 3/2001 | Reynolds | |
| 6,248,976 B1 | 6/2001 | Blankenship | |
| 6,259,059 B1 | 7/2001 | Hsu | |
| 6,265,688 B1 | 7/2001 | Lyshkow | |
| 6,274,845 B1 | 8/2001 | Stava | |
| 6,278,074 B1 | 8/2001 | Morlock | |
| 6,292,715 B1 | 9/2001 | Rongo | |
| 6,331,694 B1 | 12/2001 | Blankenship | |
| 6,359,258 B1 | 3/2002 | Blankenship | |
| 6,479,792 B1 | 11/2002 | Beiermann | |
| 6,486,439 B1 | 11/2002 | Spear et al. | |
| 6,515,259 B1 | 2/2003 | Hsu | |
| 6,559,416 B1 | 5/2003 | Steenis | |
| 6,583,386 B1 | 6/2003 | Ivkovich | |
| 6,596,970 B2 | 7/2003 | Blankenship | |
| 6,624,388 B1 | 9/2003 | Blankenship et al. | |
| 6,642,482 B2 | 11/2003 | Rappl | |
| 6,670,579 B2 | 12/2003 | Davidson et al. | |
| 6,707,001 B1 | 3/2004 | Ulrich | |
| 6,710,297 B1 | 3/2004 | Artelsmair | |
| 6,720,529 B2 | 4/2004 | Davidson | |
| 6,744,012 B2 | 6/2004 | Ueda | |
| 6,747,247 B2 | 6/2004 | Holverson | |
| 6,849,828 B2 | 2/2005 | Aigner | |
| 6,906,284 B2 | 6/2005 | Kim | |
| 6,909,067 B2 | 6/2005 | Davidson | |
| 6,933,466 B2 | 8/2005 | Hutchison | |
| 6,958,263 B2 | 10/2005 | Bhattacharyya | |
| 6,974,931 B2 | 12/2005 | Holverson | |
| 6,974,932 B2 | 12/2005 | Holverson | |
| 6,984,806 B2 | 1/2006 | Huismann | |
| 6,995,338 B2 | 2/2006 | Hutchison | |
| 7,002,103 B2 | 2/2006 | Holverson | |
| 7,105,775 B2 | 9/2006 | Giese | |
| 7,129,443 B2 | 10/2006 | Davidson | |
| 7,145,101 B2 | 12/2006 | Tong | |
| 7,244,905 B2 | 7/2007 | Das | |
| 7,247,815 B2 | 7/2007 | Lajoie | |
| 7,265,320 B2 | 9/2007 | Ou | |
| 7,304,269 B2 | 12/2007 | Fulmer | |
| 7,306,951 B1 | 12/2007 | Benson | |
| 7,307,240 B2 | 12/2007 | Holverson | |
| 7,351,933 B2 | 4/2008 | Huismann | |
| 7,381,923 B2 | 6/2008 | Gordon | |
| 7,576,300 B2 | 8/2009 | Giese | |
| 7,626,139 B2 | 12/2009 | Matsuguchi | |
| 7,663,074 B2 | 2/2010 | Wells | |
| 7,683,290 B2 | 3/2010 | Daniel | |
| 7,762,830 B2 | 7/2010 | Roberts | |
| 8,203,100 B2 | 6/2012 | Ueda | |
| 8,288,686 B2 | 10/2012 | Kaufman | |
| 8,304,692 B2 | 11/2012 | Ohkubo | |
| 8,304,693 B2 | 11/2012 | Ma | |
| 8,357,877 B2 | 1/2013 | Ma | |
| 8,487,215 B2 | 7/2013 | Holverson | |
| 8,604,388 B2 | 12/2013 | Dingeldein | |
| 9,095,928 B2 | 8/2015 | Ash | |
| 9,162,312 B2 | 10/2015 | Ma | |
| 9,193,004 B2 | 11/2015 | Enyedy et al. | |
| 9,193,005 B2 | 11/2015 | Ma | |
| 9,227,262 B2 | 1/2016 | Wiryadinata | |
| 9,233,432 B2 | 1/2016 | Zhang | |
| 9,403,231 B2 | 8/2016 | Hutchison | |
| 9,409,250 B2 | 8/2016 | Daniel | |
| 9,463,523 B2 | 10/2016 | Roth | |
| 9,539,662 B2 | 1/2017 | Hutchison | |
| 9,669,486 B2 | 6/2017 | Dingeldein | |
| 9,862,050 B2 | 1/2018 | Cole | |
| 9,925,613 B2 * | 3/2018 | Rozmarynowski | B23K 9/1043 |
| 9,950,383 B2 | 4/2018 | Davidson | |
| 10,086,466 B2 * | 10/2018 | Admuthe | B23K 9/1043 |
| 10,232,458 B2 | 3/2019 | Grossauer | |
| 10,406,621 B2 | 9/2019 | Salsich | |
| 10,675,699 B2 | 6/2020 | Hsu | |
| 10,843,288 B2 | 11/2020 | Salsich | |
| 10,994,362 B2 | 5/2021 | Raudsepp | |
| 11,007,597 B2 | 5/2021 | Salsich | |

(56) References Cited

U.S. PATENT DOCUMENTS

| | | |
|---|---|---|
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Arndt |
| 2003/0010756 A1 | 1/2003 | Enyedy |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |
| 2004/0238511 A1 | 12/2004 | Matus |
| 2005/0072762 A1 | 4/2005 | Delgado |
| 2005/0082268 A1 | 4/2005 | Lajoie |
| 2005/0184039 A1 | 8/2005 | Stava |
| 2005/0218132 A1 | 10/2005 | Wells |
| 2005/0269306 A1 | 12/2005 | Fulmer |
| 2006/0138115 A1 | 6/2006 | Norrish |
| 2006/0163219 A1 | 7/2006 | Griffin |
| 2006/0163227 A1 | 7/2006 | Hillen |
| 2006/0163229 A1 | 7/2006 | Hutchison |
| 2007/0039935 A1 | 2/2007 | Justice |
| 2007/0051711 A1 | 3/2007 | Kachline |
| 2007/0056945 A1 | 3/2007 | Hammen |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0053978 A1 | 3/2008 | Peters |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson et al. |
| 2009/0215302 A1 | 8/2009 | Roberts |
| 2010/0012637 A1 | 1/2010 | Jaegar |
| 2010/0059493 A1 | 3/2010 | McAninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0168678 A1 | 7/2011 | Takeda |
| 2011/0204034 A1 | 8/2011 | Schartner |
| 2011/0204035 A1 | 8/2011 | Grossauer |
| 2011/0248007 A1 | 10/2011 | Takeda |
| 2011/0266269 A1 | 11/2011 | Kachline |
| 2011/0297658 A1 | 12/2011 | Peters |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0213942 A1 | 8/2013 | Peters |
| 2013/0256276 A1 | 10/2013 | Fisher |
| 2013/0264323 A1 | 10/2013 | Daniel |
| 2013/0270245 A1 | 10/2013 | Holverson |
| 2013/0313241 A1 | 11/2013 | Zander |
| 2014/0008328 A1 | 1/2014 | Enyedy |
| 2014/0008331 A1 | 1/2014 | Ogborn |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1 | 1/2014 | Peters |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0131339 A1 | 5/2014 | Fischer |
| 2014/0158669 A1 | 6/2014 | Davidson |
| 2014/0177109 A1 | 6/2014 | Curtis |
| 2014/0183176 A1 | 7/2014 | Hutchison |
| 2014/0199878 A1 | 7/2014 | Ihde |
| 2014/0217077 A1 | 8/2014 | Davidson |
| 2014/0251965 A1 | 9/2014 | Wiryadinata |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0263251 A1 | 9/2014 | Enyedy |
| 2014/0319103 A1 | 10/2014 | Stabb et al. |
| 2014/0366721 A1 | 12/2014 | Roy |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney et al. |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1 | 7/2015 | Denney |
| 2015/0213921 A1 | 7/2015 | Koide |
| 2015/0251275 A1 | 9/2015 | Denney et al. |
| 2015/0273612 A1 | 10/2015 | Peters |
| 2015/0283638 A1 | 10/2015 | Henry |
| 2015/0283639 A1 | 10/2015 | Henry |
| 2016/0074954 A1 | 3/2016 | Marschke |
| 2016/0074973 A1 | 3/2016 | Kachline |
| 2016/0144444 A1 | 5/2016 | Davidson |
| 2016/0167151 A1 | 6/2016 | Mehn |
| 2016/0175975 A1 | 6/2016 | Lattner |
| 2016/0199939 A1 | 7/2016 | Hartman |
| 2016/0221105 A1 | 8/2016 | Henry |
| 2016/0288235 A1 | 10/2016 | Davidson |
| 2016/0318112 A1 | 11/2016 | Hutchison |
| 2017/0064804 A1 | 3/2017 | Namburu |
| 2017/0080512 A1 | 3/2017 | Centner |
| 2017/0165778 A1 | 6/2017 | Hsu |
| 2017/0216953 A1 | 8/2017 | Salsich |
| 2017/0225255 A1 | 8/2017 | Zwayer |
| 2018/0085842 A1 | 3/2018 | Lattner |

(56) References Cited

U.S. PATENT DOCUMENTS

| | | | |
|---|---|---|---|
| 2018/0236585 A1 | 8/2018 | Davidson | |
| 2018/0333798 A1* | 11/2018 | Uecker | B23K 9/1012 |
| 2018/0354052 A1 | 12/2018 | Schartner | |
| 2018/0354053 A1 | 12/2018 | Zwayer | |
| 2018/0354057 A1 | 12/2018 | Sigl | |
| 2018/0354075 A1 | 12/2018 | Liu | |
| 2019/0061039 A1 | 2/2019 | Doyle | |

FOREIGN PATENT DOCUMENTS

| | | | |
|---|---|---|---|
| CA | 2242273 | | 2/2000 |
| CA | 2862671 | | 10/2013 |
| CA | 2883947 | | 3/2014 |
| CH | 472922 | | 5/1969 |
| CN | 1031342 | | 3/1989 |
| CN | 2125475 | | 12/1992 |
| CN | 2181354 | | 11/1994 |
| CN | 1102480 | | 5/1995 |
| CN | 2215372 | | 12/1995 |
| CN | 1191790 | | 9/1998 |
| CN | 1220626 | | 6/1999 |
| CN | 1298778 | | 6/2001 |
| CN | 1496774 | | 5/2004 |
| CN | 1558706 | | 12/2004 |
| CN | 1600486 | | 3/2005 |
| CN | 1640603 | | 7/2005 |
| CN | 1665633 | | 9/2005 |
| CN | 1712168 | | 12/2005 |
| CN | 1714978 | | 1/2006 |
| CN | 1836818 | | 9/2006 |
| CN | 1871093 | | 11/2006 |
| CN | 101041202 | | 9/2007 |
| CN | 101062530 | | 10/2007 |
| CN | 201098775 | | 8/2008 |
| CN | 101360580 | | 2/2009 |
| CN | 101376191 | | 3/2009 |
| CN | 101434017 | | 5/2009 |
| CN | 201249331 | | 6/2009 |
| CN | 101474707 | | 7/2009 |
| CN | 101715378 | | 5/2010 |
| CN | 101804495 | | 8/2010 |
| CN | 101821049 | | 9/2010 |
| CN | 101862886 | | 10/2010 |
| CN | 102059476 | | 5/2011 |
| CN | 102126077 | | 7/2011 |
| CN | 102458749 | | 5/2012 |
| CN | 102470473 | | 5/2012 |
| CN | 102554418 | | 7/2012 |
| CN | 102596475 | | 7/2012 |
| CN | 102649202 | | 8/2012 |
| CN | 102770228 | | 11/2012 |
| CN | 102825370 | | 12/2012 |
| CN | 102861975 | | 1/2013 |
| CN | 102873475 | | 1/2013 |
| CN | 202639618 | | 1/2013 |
| CN | 202824943 | | 3/2013 |
| CN | 103347639 | | 10/2013 |
| CN | 103600161 | | 2/2014 |
| CN | 103624378 | | 3/2014 |
| CN | 104043895 | | 9/2014 |
| CN | 104093516 | | 10/2014 |
| CN | 104115085 | | 10/2014 |
| CN | 104263897 | | 1/2015 |
| CN | 104493368 | | 4/2015 |
| CN | 104508161 | | 4/2015 |
| CN | 104511680 | | 4/2015 |
| CN | 104968465 | | 10/2015 |
| CN | 105246634 | | 1/2016 |
| CN | 105377493 | | 3/2016 |
| CN | 105414726 | | 3/2016 |
| CN | 105710503 | | 6/2016 |
| CN | 105880814 | | 8/2016 |
| CN | 205437448 | | 8/2016 |
| CN | 206065630 | | 4/2017 |
| CN | 206216093 | | 6/2017 |
| CN | 108472759 | | 8/2018 |
| DE | 2228701 | | 12/1972 |
| DE | 2501928 | | 7/1976 |
| DE | 19808383 | | 9/1999 |
| DE | 212004000048 | | 6/2006 |
| DE | 102016010341 | | 3/2017 |
| EP | 0150543 | | 8/1985 |
| EP | 0194045 | | 9/1986 |
| EP | 0204559 | | 12/1986 |
| EP | 0387223 | | 9/1990 |
| EP | 0936019 | A2 | 8/1999 |
| EP | 0936019 | A3 | 3/2001 |
| EP | 1232825 | | 8/2002 |
| EP | 2218537 | | 8/2010 |
| EP | 2286949 | | 2/2011 |
| EP | 2322315 | | 5/2011 |
| EP | 2522453 | | 11/2012 |
| EP | 2892680 | | 7/2015 |
| EP | 2781291 | | 10/2015 |
| FR | 1443701 | | 6/1966 |
| JP | S5719166 | | 2/1982 |
| JP | S57109573 | | 7/1982 |
| JP | S583784 | | 1/1983 |
| JP | S5874278 | | 5/1983 |
| JP | S58119466 | | 7/1983 |
| JP | S60108175 | | 6/1985 |
| JP | S60108176 | | 6/1985 |
| JP | S60170577 | | 9/1985 |
| JP | 61186172 | | 8/1986 |
| JP | S629773 | | 1/1987 |
| JP | S6297773 | | 5/1987 |
| JP | S6471575 | | 3/1989 |
| JP | S6471575 | A | 3/1989 |
| JP | H03285768 | | 12/1991 |
| JP | H06277840 | | 10/1994 |
| JP | H07204848 | | 8/1995 |
| JP | H1097327 | | 4/1998 |
| JP | H11156542 | | 6/1999 |
| JP | 2001276971 | | 10/2001 |
| JP | 2003205385 | | 7/2003 |
| JP | 2003311409 | | 11/2003 |
| JP | 2005034853 | | 2/2005 |
| JP | 2006205189 | | 8/2006 |
| JP | 2007504003 | | 3/2007 |
| JP | 2009072814 | | 4/2009 |
| JP | 4950819 | | 6/2012 |
| JP | 2014176890 | | 9/2014 |
| KR | 1020060133016 | | 12/2006 |
| KR | 20080009816 | | 1/2008 |
| KR | 20100120562 | | 11/2010 |
| KR | 1020120027764 | | 3/2012 |
| KR | 101497460 | | 3/2015 |
| KR | 20180032079 A | * | 3/2018 |
| MX | 2011000579 | | 3/2011 |
| SU | 872102 | | 10/1981 |
| WO | 9640465 | | 12/1996 |
| WO | 9965635 | | 12/1999 |
| WO | 0075634 | | 12/2000 |
| WO | 0132347 | | 5/2001 |
| WO | 0153030 | | 7/2001 |
| WO | 2005030422 | | 4/2005 |
| WO | 2010144688 | | 12/2010 |
| WO | 2014140783 | | 9/2014 |
| WO | 2014155180 | | 10/2014 |
| WO | 2015076891 | | 5/2015 |
| WO | 2015124977 | | 8/2015 |
| WO | 2015125008 | | 8/2015 |

OTHER PUBLICATIONS

Int'l Search Report and Written Opinion Appln No. PCT/U2019/067491 mailed Jun. 25, 2020.
European Office Action Appln No. 20164462.2 dated Sep. 7, 2020.
"ALT 304," Miller—The Power of Blue, Jun. 2001.
"Maxstar 200 SD, DX, and LX," Miller Electric Mfg. Co., Oct. 2003.

(56)                    References Cited

OTHER PUBLICATIONS

Bondy et al., "Graph Theory with Applications," Department of Combinatorics and Optimization, University of Waterloo, 1976, p. 7-8.

Canadian Office Action ApplIn No. 3,005,408 dated Mar. 19, 2019.

Gupta, "A low temperature hydrogen sensor based on palladium nanoparticles," Published in 2014.

Int'l Search Report and Written Opinion Appln No. PCT/U2019/049109 mailed Dec. 2, 2019 (11 pgs).

Int'l Search Report and Written Opinion Appln No. PCT/US2019/050972, mailed Nov. 14, 2019, (13 pgs).

Int'l Search Report and Written Opinion for PCT/US2016/065265 dated Mar. 14, 2017 (16 pages).

Int'l Search Report and Written Opinion for PCT/US2018/029770 mailed Sep. 12, 2018 (13 pgs.).

Int'l Search Report and Written Opinion for PCT/US2018/035087 mailed Sep. 19, 2018 (15 pgs.).

Int'l Search Report and Written Opinion for PCT/US2018/036852 mailed Oct. 2, 2018 (17 pgs.).

Int'l Search Report and Written Opinion for PCT/US2018/036898 mailed Oct. 1, 2018 (14 pgs.).

Int'l Search Report and Written Opinion for PCT/US2018/036900 mailed Oct. 5, 2018 (15 pgs.).

Int'l Search Report and Written Opinion for PCT/US2018/036906 mailed Oct. 1, 2018 (15 pgs.).

Int'l Search Report and Written Opinion in PCT/US2018/036914 mailed Oct. 2, 2018 (14 pgs.).

Int'l Search Report and Written Opinion for PCT/US2018/036915 mailed Oct. 1, 2018 (15 pgs).

Int'l Search Report and Written Opinion for PCT/US2018/036919 mailed Oct. 2, 2018 (13 pgs.).

Int'l Search Report and Written Opinion for PCT/US2018/049888 mailed Feb. 1, 2019 (14 pgs.).

Int'l Search Report and Written Opinion for PCT/US2018/052384 mailed Feb. 12, 2019 (12 pgs.).

International Search Report from PCT application No. PCT/US2014/017864, dated Aug. 22, 2014, 9 pgs.

International Search Report from PCT application No. PCT/US2014/041201, dated Nov. 4, 2014, 11 pg.

International Search Report from PCT application No. PCT/US2014/045872, dated Nov. 4, 2014, 10 pgs.

International Search Report from PCT Application No. PCT/US2014/055529, dated Mar. 6, 2015, 9 pgs.

International Search Report from PCT application No. PCT/US2015/045715, dated Jan. 7, 2016, 12 pgs.

International Search Report from PCT application No. PCT/US2015/055040, dated Feb. 3, 2016, 11 pgs.

International Search Report from PCT application No. PCT/US2015/056121, dated Apr. 4, 2016, 11 pgs.

International Search Report from PCT application No. PCT/US2016/017385, dated Jul. 19, 2016, 13 pgs.

International Search Report from PCT application No. PCT/US2013/073490 dated May 13, 2014, 10 pgs.

International Search Report from PCT application No. PCT/US2013/073863 dated May 2, 2014, 15 pgs.

International Search Report from PCT application No. PCT/US2013/077710 dated May 9, 2014, 12 pgs.

International Search Report from PCT application No. PCT/US2014/014241 dated May 9, 2014, 8 pgs.

Lincoln Electric, "Storing and Redrying Electrodes," Published in 2011.

N.A.: "Drahtgluhe", Aug. 23, 2016 (Aug. 23, 2016), XP055510057, Wikipedia, Retrieved from the Internet: URL:https://de.wikipedia.Org/w/index.php7title=Drahtgl%C3%BCche&oldid=157333005, [retrieved on Sep. 26, 2018], with machine translation, 2 pages.

Non-Final Office Action U.S. Appl. No. 15/343,992 dated Mar. 7, 2019 (18 pgs.).

Non-Final Office Action U.S. Appl. No. 15/498,249 dated Sep. 23, 2019 (43 pgs).

Office Action from U.S. Appl. No. 15/498,249 dated Apr. 20, 2018.

PCT International Search Report & Written Opinion of PCT/US2012/063783 dated Mar. 1, 2013, 12 pages.

PCT, IPRP, issued in connection with PCT/US2018/036898, dated Dec. 19, 2019, 7 pages.

PCT, IPRP, issued in connection with PCT/US2018/036900, dated Dec. 19, 2019, 7 pages.

Pitrun, "The effect of welding parameters on levels of diffusible hydrogen in weld metal deposited using gas shield rutile flux cored wires," Published in 2004.

European Office Action Appln No. 22199347.0 dated Feb. 20, 2023.

European Office Action Appln No. 19769649.5 dated Apr. 26, 2023.

European Exam Report Appln No. 18735142.4 dated Jun. 22, 2023.

European Exam Report Appln No. 19839586.5 dated Jul. 18, 2023.

Canadian Office Action Appln. No. 3,066,619 dated Mar. 31, 2021.

Canadian Office Action Appln. No. 3,066,677 dated Mar. 16, 2021.

Canadian Office Action Appln. No. 3,066,687 dated Mar. 16, 2021.

Canadian Office Action Appln. No. 3,066,731 dated Apr. 14, 2021.

Canadian Office Action Appln. No. 3,066,740 dated Apr. 15, 2021.

European Office Action Appln No. 18735131.7 dated Jul. 13, 2021.

European Office Action Appln No. 18735143.2 dated Mar. 24, 2021.

European Office Action Appln No. 18735144.0 dated Dec. 18, 2020.

European Office Action Appln No. 18735144.0 dated Dec. 21, 2020.

European Office Action Appln No. 18735144.0 dated Jul. 13, 2021.

European Office Action Appln No. 18735144.0 dated Mar. 9, 2022.

European Office Action Appln No. 19839586.5 dated Jul. 27, 2021.

Final Office Action U.S. Appl. No. 16/005,456 dated Jan. 5, 2022 (22 pgs).

Mohamed Cad-el-Hak, "MEMB Design and Fabrication" translated by Haixia Zhang, et al., Feb. 28, 2010, pp. 458-459.

European Office Communication with extended European Search Report Appln No. 22164117.8 dated Jul. 7, 2022.

Canadian Office Action Appln No. 3,119,550 dated Jul. 22, 2022.

\* cited by examiner

METHODS AND APPARATUS TO CONVERT WELDING-TYPE POWER TO WELDING-TYPE POWER AND RESISTIVE PREHEATING POWER

RELATED APPLICATIONS

This patent claims the benefit of U.S. Provisional Patent Application Ser. No. 62/826,320, filed Mar. 29, 2019, entitled "METHODS AND APPARATUS TO CONVERT WELDING-TYPE POWER TO WELDING-TYPE POWER AND RESISTIVE PREHEATING POWER." The entirety of U.S. Patent Application Ser. No. 62/826,320 is expressly incorporated herein by reference.

BACKGROUND

This disclosure relates generally to welding and, more particularly, to methods and apparatus to convert welding-type power to welding-type power and resistive preheating power.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

Methods and apparatus to convert welding-type power to welding-type power and resistive preheating power are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
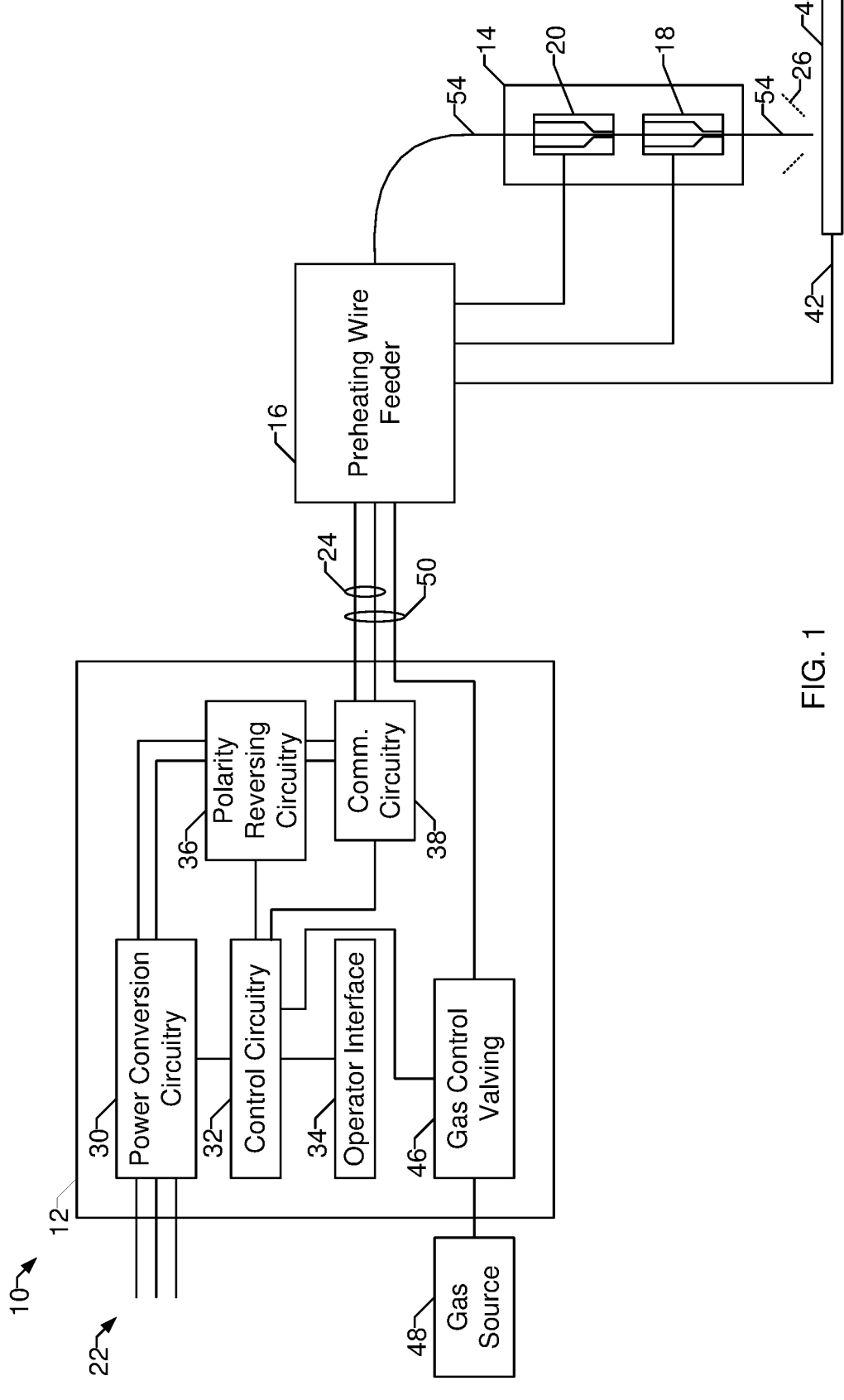
FIG. 1 illustrates an example welding system configured to transfer welding-type power to a welding accessory, such as a preheating wire feeder, for conversion to welding-type output power and resistive preheating power, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), submerged arc welding (SAW), etc.), brazing, cladding, hard-facing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Systems and methods to provide preheating power and welding power to a welding torch are disclosed herein. In particular, disclosed example systems include a welding-type power source configured to output welding-type power to a welding accessory, such as a wire feeder. The accessory includes one or more power conversion circuits to convert a portion of the input welding-type power to output welding-type power and another portion of the input welding-type power to preheating power.

In an example application, a preheating-enabled wire feeder may be selected by a weld operator and coupled to the output of a generic welding power source. The weld operator does not necessarily need to know the location of the welding power source, because the preheating-enabled wire feeder converts the power supplied by the welding power source to the welding and/or preheating power, which may be specified by the operator at the wire feeder. In some examples, the wire feeder may communicate appropriate configuration information to the connected power source to supply the power for a given welding task involving welding power and/or preheating power. Thus, disclosed example systems and methods may eliminate the need for multiple welding power sources to provide both welding and pre-heating power.

Disclosed example welding accessories include: a weld input configured to receive first welding-type power; and power conversion circuitry configured to: convert a first portion of the first welding-type power to second welding-type power; and output the second welding-type power to a weld circuit; convert a second portion of the first welding-type power to preheating power; and output the preheating power to a preheater.

In some examples, the power conversion circuitry includes first power conversion circuitry configured to convert the first portion of the first welding-type power to the second welding-type power, and second power conversion circuitry configured to convert the second portion of the first welding-type power to the preheating power. In some examples, the welding accessory includes a housing configured to enclose the first power conversion circuitry and the second power conversion circuitry. In some examples, the first power conversion circuitry and the second power conversion circuitry are configured to be electrically coupled to the welding torch via a same cable. In some example welding accessories, the first power conversion circuitry comprises a first switched-mode power supply and the second power conversion circuitry comprises a second switched-mode power supply.

Some example welding accessories further include control circuitry configured to selectively enable the power conversion circuitry to provide the preheating power and to selectively disable the power conversion circuitry to stop the preheating power. In some examples, the control circuitry is configured to selectively enable or disable the power conversion circuitry based on a user input. Some examples further include communications circuitry configured to receive the user input from at least one of a weld torch coupled to the wire feeder or a pendant. Some examples further include a user interface configured to receive a user input, in which the control circuitry is configured to control the power conversion circuitry based on the user input.

Some example welding accessories include control circuitry configured to control electrical parameters of the power conversion circuitry based on the preheating power applied to the electrode wire. Some example welding accessories include control circuitry configured to control the power conversion circuitry using a voltage-controlled control loop. Some example welding accessories include communication circuitry configured to communicate with a welding-type power supply from which the weld input receives the first welding-type power. In some examples, the control circuitry is configured to transmit electrical parameters to the welding-type power supply based on at least one of the second welding-type power or the preheating power.

In some examples, the weld input includes one terminal configured to be coupled to a weld cable, in which the power conversion circuitry is configured to output the second welding-type power to the weld circuit via one output and to be coupled to a workpiece via a volt sense cable. In some examples, the weld input includes two or more terminals coupled to two or more cables to receive the first welding-type power, wherein the power conversion circuitry is configured to output the second welding-type power to the weld circuit via two or more output terminals. In some examples, the first welding-type power includes direct current power output by a welding-type power supply. Some example welding accessories further include a wire drive configured to feed the electrode wire toward a welding torch. In some examples, the welding accessory is a wire feeder or a pendant.

In some examples, the preheater includes at least one of: a preheating circuit including a portion of an electrode wire located between a first contact point and a second contact point; an induction coil configured to heat the electrode wire; a tungsten electrode configured to establish an arc to the electrode wire; a laser configured to output energy to the electrode wire; a heating coil configured to heat the electrode wire via radiation; or a convective heating material configured to contact the electrode wire to transfer heat to the electrode wire.

Disclosed example welding systems include: first power conversion circuitry configured to: convert a first portion of the first welding-type power to second welding-type power; and output the second welding-type power to a weld circuit; second power conversion circuitry configured to: convert a second portion of the first welding-type power to preheating power; and output the preheating power to a preheater; and control circuitry configured to control the first power conversion circuitry and the second power conversion circuitry.

FIG. 1 illustrates an example welding system 10 configured to transfer welding-type power to a welding accessory, such as a preheating wire feeder 16, for conversion to welding-type output power and resistive preheating power. The example welding system 10 of FIG. 1 includes a welding power source 12 and a preheating welding torch 14. The welding torch 14 may be a torch configured for any wire-fed welding process, such as gas metal arc welding (GMAW), flux cored arc welding (FCAW), self-shielded FCAW, and/or submerged arc welding (SAW), based on the desired welding application.

The welding power source 12 supplies welding-type power to the preheating wire feeder 16, which converts the input welding-type power to one or both of output welding-type power and/or resistive preheating power, which are output to the welding torch 14. The preheating wire feeder 16 also supplies the filler metal to a welding torch 14 configured for GMAW welding, FCAW welding, or SAW welding.

The welding power source 12 is coupled to, or includes, a primary power source 22, such as an electrical grid or engine-driven generator that supplies primary power, which may be single-phase or three-phase AC power. For example, the welding power source 12 may be an engine-driven welding power source that includes the engine and generator that provides the primary power 22 within the welding power source. The welding power source 12 may process the primary power to output welding-type power for output to the welding torch 14 or the wire feeder 16 via power cables 24. In some examples, the power cables 24 includes multiple terminals, in which one terminal has a positive polarity and another terminal has a negative polarity. Power conversion circuitry 30 converts the primary (e.g., AC) current to welding-type power as either direct current (DC) or AC. The power conversion circuitry 30 may include circuit elements such as transformers, switches, boost converters, inverters, and so forth, capable of converting power as dictated by the demands of the welding system 10. In some embodiments, the power conversion circuitry 30 is configured to convert the primary power to an approximately 80V DC welding-type power to supply the preheating wire feeder 16. Such example input power may be between approximately 50 to 120V DC.

The welding power source 12 includes control circuitry 32 and an operator interface 34. The control circuitry 32 controls the operations of the welding power source 12 and may receive input from the operator interface 34 through which an operator may choose a welding process (e.g., GMAW, FCAW, SAW) and input desired parameters of the input power (e.g., voltages, currents, particular pulsed or non-pulsed welding regimes, and so forth). The control circuitry 32 may be configured to receive and process a plurality of inputs regarding the performance and demands of the system 10.

The welding power source 12 may include polarity reversing circuitry 36 and communications circuitry 38 coupled to the control circuitry 32. The polarity reversing circuitry 36 reverses the polarity of the output welding-type power when directed by the control circuitry 32. For example, some welding processes, such as TIG welding, may enable a desired weld when the electrode has a negative polarity, known as DC electrode negative (DCEN). Other welding processes, such as stick or GMAW welding, may enable a desired weld when the electrode has a positive polarity, known as DC electrode positive (DCEP). When switching between a TIG welding process and a GMAW welding process, the polarity reversing circuitry 36 may be configured to reverse the polarity from DCEN to DCEP. Additionally or alternatively, the operator may simply connect the terminals of the cable 24 to the preheating wire feeder 16 without knowledge of the polarity, such as when the terminals are located a substantial distance from the power source 12. The control circuitry 32 may direct the polarity reversing circuitry 36 to reverse the polarity in response to signals received through the communications circuitry 38.

In some examples, the communications circuitry 38 is configured to communicate with the welding torch 14, the preheating wire feeder 16, and/or other device(s) coupled to the power cables 24. The communications circuitry 38 sends and receives command and/or feedback signals over the welding power cables 24 used to supply the welding-type power. Additionally or alternatively, the communications circuitry 38 communicates wirelessly with the welding torch 14, the preheating wire feeder 16, and/or other device(s).

For some welding processes (e.g., GMAW), a shielding gas is utilized during welding. In the example of FIG. 1, the welding power source 12 includes one or more gas control valves 46 configured to control a gas flow from a gas source 48. The control circuitry 32 controls the gas control valves 46. The welding power source 12 may be coupled to one or multiple gas sources 48 because, for example, some welding processes may utilize different shielding gases than others. In some examples, the welding power source 12 is configured to supply the gas with the input power via a combined input cable 50 (e.g., including the conductors included in the cable 24). In other examples, the gas control valves 46 and gas source 48 may be separate from the welding power source 12. For example, the gas control valves 46 may be disposed within the preheating wire feeder 16, as described below with reference to FIG. 2.

The preheating wire feeder 16 receives the welding-type power as an input via input terminals configured to couple with the terminals of the power cables 24. The example preheating wire feeder 16 of FIG. 1 is coupled to a preheating GMAW torch 14 configured to supply the gas, welding wire 54, and electrical power to the welding application. As discussed in more detail below, the preheating wire feeder 16 is configured to receive input welding-type power from the power source 12, convert a first portion of the input welding-type power to second welding-type power and output the second welding-type power to a weld circuit, and convert a second portion of the input welding-type power to preheating power and output the preheating power to a preheating circuit.

The example torch 14 includes a first contact tip 18 and a second contact tip 20. The electrode wire 54 is fed from the preheating wire feeder 16 to the torch 14 and through the contact tips 18, 20, to produce a welding arc 26 between the electrode wire 54 and the workpiece 44. The preheating circuit includes the first contact tip 18, the second contact tip 20, and a portion of the electrode wire 54 that is located between the first contact tip 18 and a second contact tip 20. The example preheating wire feeder 16 is further coupled to a work cable 42 that is coupled to the workpiece 44.

In operation, the electrode wire 54 passes through the second contact tip 20 and the first contact tip 18, between which the preheating wire feeder 16 outputs a preheating current to heat the electrode wire 54. Specifically, in the configuration shown in FIG. 1, the preheating current enters the electrode wire 54 via the second contact tip 20 and exits via the first contact tip 18. However, the preheating current may be conducted in the opposite direction. At the first contact tip 18, a welding current may also enter (or exit) the electrode wire 54. The welding current is output by the preheating wire feeder 16, which derives the preheating power and the welding-type power from the welding-type power supplied by the power source 12. The welding current exits the electrode wire 54 via the workpiece 44, which in turn generates the welding arc 26. When the electrode wire 54 makes contact with the workpiece 44, an electrical circuit is completed and the welding current flows through the electrode wire 54, across the metal work piece(s) 44, and returns to the preheating wire feeder 16. The welding current causes the electrode wire 54 and the parent metal of the work piece(s) 44 in contact with the electrode wire 54 to melt, thereby joining the work pieces as the melt solidifies. By preheating the electrode wire 54, the welding arc 26 may be generated with drastically reduced arc energy. Generally speaking, the preheating current is proportional to the distance between the contact tips 18, 20 and the electrode wire 54 size.

Figure 2:
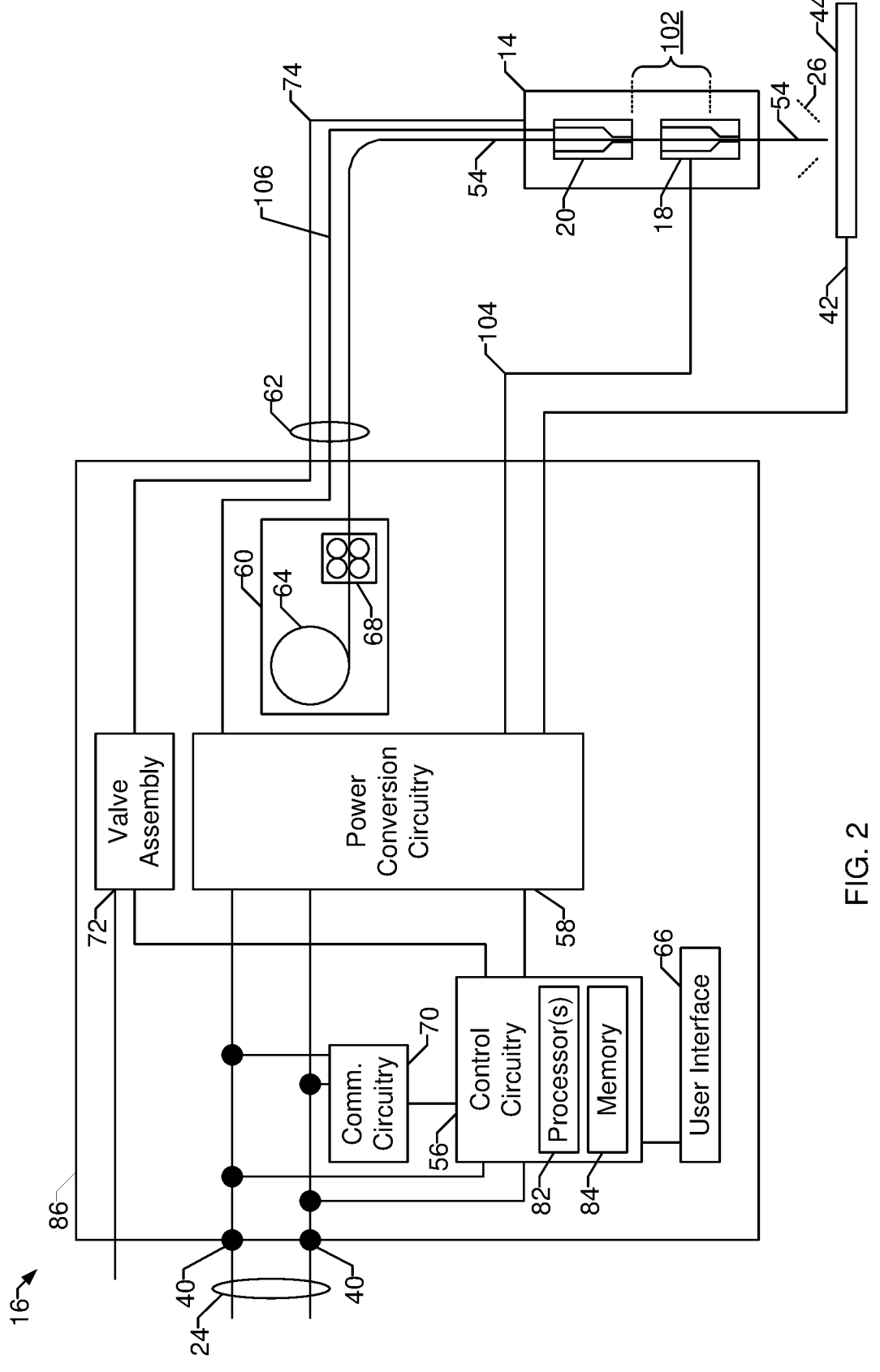
FIG. 2 is a block diagram of an example implementation of the preheating wire feeder of FIG. 1.

FIG. 2 is a block diagram of an example implementation of the preheating wire feeder 16 of FIG. 1. The example preheating wire feeder 16 receives welding-type power as an input, and converts the welding-type power to welding-type power and/or preheating power. For example, the preheating wire feeder 16 may output welding-type power and preheating power simultaneously, alternate outputting the welding-type power and the preheating power, and/or output only one of welding-type power or preheating power at a given time, based on the welding task and/or operator experience.

The preheating wire feeder 16 receives the input power from the welding power source 12 of FIG. 1 via input terminals 40 coupled to control circuitry 56. The preheating wire feeder 16 may be operated remotely from the welding power source 12 with relatively long power cables coupling the preheating wire feeder 16 to the welding power source 12.

The control circuitry 56 includes one or more controller(s) and/or processor(s) 82 that controls the operations of the preheating wire feeder 16. The control circuitry 56 receives and processes multiple inputs associated with the performance and demands of the system. The processor(s) 82 may include one or more microprocessors, such as one or more "general-purpose" microprocessors, one or more special-purpose microprocessors and/or ASICS, one or more micro-controllers, and/or any other type of processing and/or logic device. For example, the control circuitry 56 may include one or more digital signal processors (DSPs). The control circuitry 56 may include circuitry such as relay circuitry, voltage and current sensing circuitry, power storage circuitry, and/or other circuitry, and is configured to sense the input power received by the preheating wire feeder 16.

The example control circuitry 56 includes one or more memory device(s) 84. The memory device(s) 84 may include volatile and/or nonvolatile memory and/or storage devices, such as random access memory (RAM), read only memory (ROM), flash memory, hard drives, solid state storage, and/or any other suitable optical, magnetic, and/or solid-state storage mediums. The memory device(s) 84 store data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth. The memory device 84 may store machine executable instructions (e.g., firmware or software) for execution by the processor(s) 82. Additionally or alternatively, one or more control schemes for various welding processes, along with associated settings and parameters, may be stored in the memory device(s) 84, along with machine executable instructions configured to provide a specific output (e.g., initiate wire feed, enable gas flow, capture welding current data, detect short circuit parameters, determine amount of spatter) during operation.

The preheating wire feeder 16 further includes power conversion circuitry 58. The power conversion circuitry 58 is configured to convert a first portion of the input welding-type power to second welding-type power and convert a second portion of the input welding-type power to preheating power. The first and second portions of the input welding-type power may be divided by time (e.g., the first portion is used at a first time and the second portion is used at a second time) and/or as portions of the total delivered power at a given time. The power conversion circuitry 58 outputs the second welding-type power to a weld circuit, and outputs the preheating power to a preheating circuit. Both the weld circuit and the preheating circuit may be implemented using the welding torch 14.

The power conversion circuitry 58 may include circuit elements such as boost converters, buck converters, half-bridge converters, full-bridge converters, forward converters, flyback converters, an internal bus, bus capacitor, voltage and current sensors, and/or any other topologies and/or circuitry to convert the input power to the welding power and the preheating power, and to output the welding power and the preheating power to the torch 14. In some examples, input power received by the preheating wire feeder 16 is a DC voltage between approximately 20V to 120V, approximately 40V to 100V, or approximately 60V to 80V. As used in reference to the input power, the term approximately may mean within 5 volts or within 310 percent of the desired voltage.

The power conversion circuitry 58 may be configured to convert the input power to any conventional and/or future welding-type output. The example power conversion circuitry 58 may implement one or more controlled voltage control loop(s) and/or one or more controlled current control loop(s) to control the voltage and/or current output to the welding circuit and/or to the preheating circuit. As described in more detail below, the power conversion circuitry 58 may be implemented using one or more converter circuits, such as multiple converter circuits in which each of the welding-type output and the preheating output is produced using separate ones of the converter circuits.

In some examples, the power conversion circuitry 58 is configured to convert the input power to a controlled waveform welding output, such as a pulsed welding process or a short circuit welding process (e.g., regulated metal deposition (RMD™)). The power conversion circuitry 58 disposed within the preheating wire feeder 16 supplies the controlled waveform welding output for the welding application without attenuation from the power cable between the welding power source and the preheating wire feeder 16. This increases the response time and accuracy of the controlled waveform welding output supplied to the welding torch. Increasing the response time of the controlled waveform welding output may ensure that the desired welding output waveform is supplied to welding torch at specific times during the weld. For example, the RMD™ welding process utilizes a controlled waveform welding output having a current waveform that varies at specific points in time over a short circuit cycle. Increasing the response time of the controlled waveform welding output may also improve the timing of the waveform pulses to produce a desired weld.

In some examples, the power conversion circuitry 58 is configured to provide the welding output to the wire feed assembly 60. The wire feed assembly 60 supplies welding wire 54 to the welding torch for the welding operation. The wire feed assembly 60 includes elements such as a wire spool 64 and a wire feed drive configured to power drive rolls 68. The wire feed assembly 60 feeds welding wire 54 to the welding torch along a weld cable 62. The welding output may be supplied through the weld cable 62 coupled to the welding torch and/or the work cable 42 coupled to the workpiece 44.

The example preheating wire feeder 16 includes a user interface 66 for control of parameters of the welding system 10. The user interface 66 is coupled to the control circuitry 56 for operator selection and adjustment of the welding process (e.g., pulsed, short-circuit, FCAW) through selection of the wire size, wire type, material, and gas parameters. The user interface 66 is coupled to the control circuitry 56 for control of the voltage, amperage, wire feed speed, and arc length for a welding application. The user interface 66 may receive inputs using any input device, such as via a keypad, keyboard, buttons, touch screen, voice activation system, wireless device, etc.

The user interface 66 may receive inputs specifying wire material (e.g., steel, aluminum), wire type (e.g., solid, cored), wire diameter, gas type, and/or any other parameters. Upon receiving the input, the control circuitry 56 determines the welding output for the welding application. For example, the control circuitry 56 may determine weld voltage, weld current, wire feed speed, inductance, weld pulse width, relative pulse amplitude, wave shape, preheating voltage, preheating current, preheating pulse, preheating resistance, preheating energy input, and/or any other welding and/or preheating parameters for a welding process based at least in part on the input received through the user interface 66.

The example preheating wire feeder 16 further includes communications circuitry 70 coupled to the control circuitry 56 to send and receive command and/or feedback signals over the power cable used to provide the input power to the preheating wire feeder. The communications circuitry 70 may further enable the user interface 66 to control the welding power source. For example, the user interface 66 may be configured to control the amperage, voltage, or other parameters of the input power supplied by the welding power source 12. In some examples, the control circuitry 56 controls the welding power source 12 from a location remote from the welding power source 12, without being restricted to parameters set on the operator interface 34 (FIG. 1). That is, the control circuitry 56 and communications circuitry 70 enable an operator to control the welding power source 12 remotely through the preheating wire feeder 16 with equal control priority to the operator interface 34 of the welding power source.

The communications circuitry 70 may communicate data to other devices in the system 10 of FIG. 1 via wireless connections. Additionally or alternatively, the communications circuitry 70 communicates with other welding devices using one or more wired connections, such as by using a network interface controller (NIC) to communicate data via a network (e.g., ETHERNET, 10baseT, 10base100, etc.), and/or communications via the terminals 40 through which the welding-type input power is received. Example implementations of the communications circuitry 70 are described in U.S. Pat. No. 9,012,807. The entirety of U.S. Pat. No.

9,012,807 is incorporated herein by reference. However, other implementations of the communications circuitry 70 may be used.

In the illustrated example wire feeder 16, a valve assembly 72 is included for providing gas to the welding torch 14 along a gas line 74. The valve assembly 72 may be controlled by the control circuitry 56. For example, the valve assembly 72 may be configured to supply gas to the welding torch 14 prior to and after a welding task. In some examples, the valve assembly 72 is configured to purge the gas line 74 upon receiving a purge command from the user interface 66.

During operation, the power conversion circuitry 58 establishes a welding circuit to conduct welding current from the power conversion circuitry 58 to the first contact tip 18, and returns to the power conversion circuitry 58 via the welding arc 26, the workpiece 44, and the work cable 42.

During operation, the power conversion circuitry 58 establishes a preheating circuit to conduct preheating current through a section 102 of the electrode wire 54. The preheating current flows from the power conversion circuitry 58 to the second contact tip 20 via a first cable 106, through the section 102 of the electrode wire 54 to the first contact tip 18, and returns to the power conversion circuitry 58 via a second cable 104 connecting the power conversion circuitry 58 to the first contact tip 18. Either, both, or neither of the cables 104, 106 may be combined with other cables and/or conduits. For example, the cable 104 and/or the cable 106 may be part of the cable 62. In other examples, the cable 106 is included within the cable 62, and the cable 104 is routed separately to the torch 14. To this end, the preheating wire feeder 16 may include between one and three terminals to which one or more cables can be physically connected to establish the preheating, welding, and work connections. For example, multiple connections can be implemented into a single terminal using appropriate insulation between different connections.

Because the preheating current path is superimposed with the welding current path over the connection between the first contact tip 18 and the power conversion circuitry 58 (e.g., via cable 104), the cable 104 may enable a more cost-effective single connection between the first contact tip 18 and the power conversion circuitry 58 (e.g., a single cable) than providing separate connections for the welding current to the first contact tip 18 and for the preheating current to the first contact tip 18.

Figure 3:
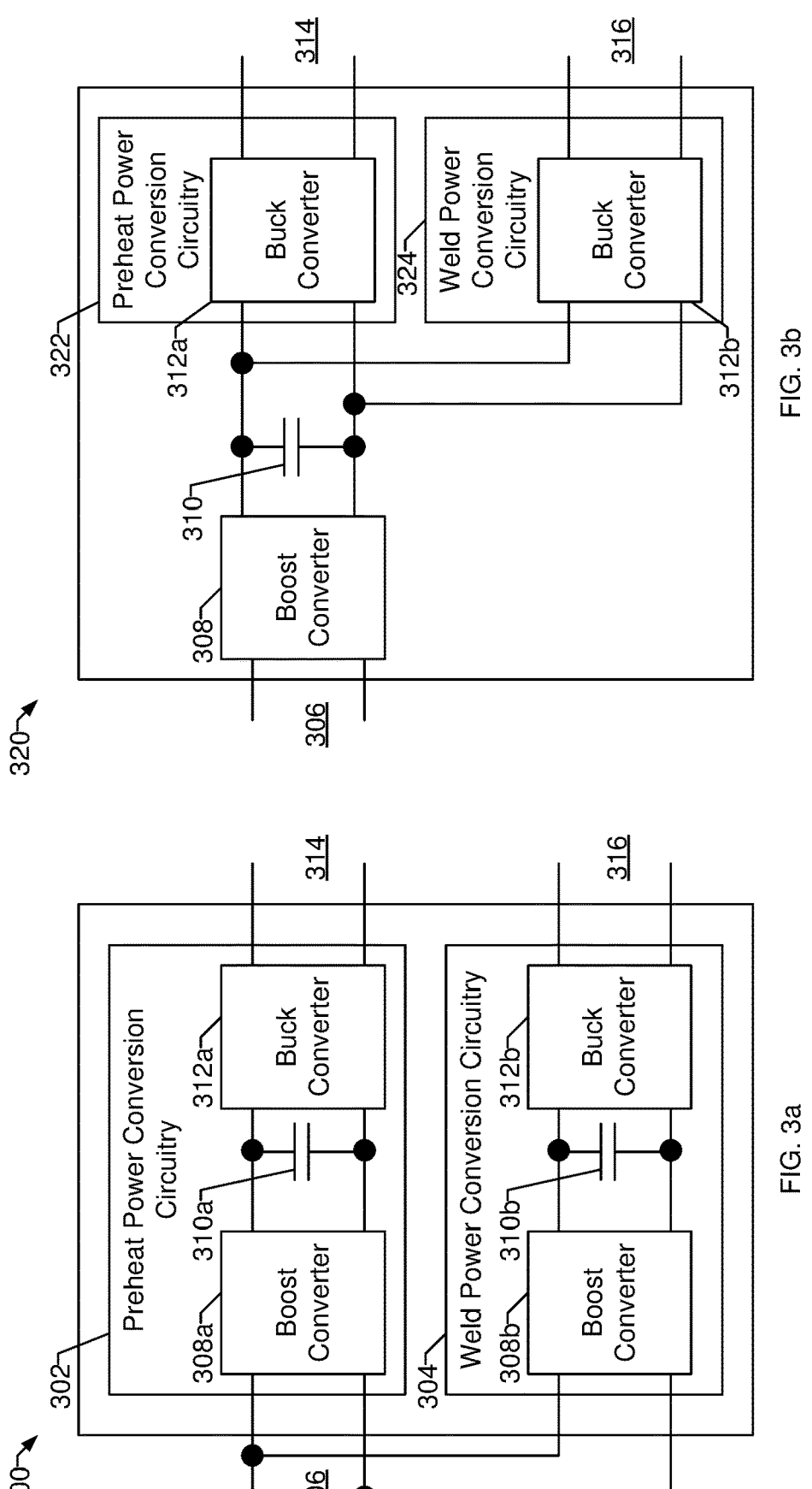
FIG. 3a is a block diagram of an example implementation of the power conversion circuitry of FIG. 2.
FIG. 3b is a block diagram of another example implementation of the power conversion circuitry of FIG. 2.

The example preheating wire feeder 16 includes a housing 86, within which the control circuitry 56, the power conversion circuitry 58, the wire feed assembly 60, the user interface 66, the communications circuitry 70, and/or the valve assembly 72 are enclosed. In examples in which the power conversion circuitry 58 includes multiple power conversion circuits (e.g., a preheating power conversion circuit and a welding power conversion circuit), all of the power conversion FIG. 3a is a block diagram of example power conversion circuitry 300 that may be used to implement the power conversion circuitry 58 of FIG. 2 to convert input welding-type power to output welding-type power and preheating power. The example power conversion circuitry 300 of FIG. 3a includes preheat power conversion circuitry 302 and weld power conversion circuitry 304. The preheat power conversion circuitry 302 and weld power conversion circuitry 304 are both coupled to an input to receive respective portions of the welding-type input power 306 (e.g., from the power source 12, via the terminals 40 of FIG. 2).

Each of the example preheat power conversion circuitry 302 and the weld power conversion circuitry 304 includes respective conversion circuitry. In the example of FIG. 3*a*, the preheat power conversion circuitry 302 includes a boost converter circuit 308*a*, a bus capacitor 310*a*, and a buck converter circuit 312*a*. Similarly, the weld power conversion circuitry 304 includes a boost converter circuit 308*b*, a bus capacitor 310*b*, and a buck converter circuit 312*b*. The boost converter circuits 308*a*, 308*b* are each configured to convert the input welding-type power 306 to respective bus voltages that are output to the respective buck converters 312*a*, 312*b*. The example buck converters 312*a*, 312*b* convert the bus voltage to a desired output. For example, the buck converter 312*a* converts the bus voltage output by the boost converter 310*a* to a preheating output 314, having a preheating output voltage and/or a preheating output current. Similarly, the buck converter 312*b* converts the bus voltage output by the boost converter 308*b* to a weld output 316, having a welding output voltage and/or a welding output current The bus capacitors 310*a*, 310*b* store energy to reduce bus voltage ripple due to changes in power output by the buck converters 312*a*, 312*b*.

The example control circuitry 56 of FIG. 2 controls the boost converters 308*a*, 308*b* and the buck converters 312*a*, 312*b*, according to the input welding-type current and the desired preheating output and the desired welding output. The control circuitry 56 may control one or both of the preheat power conversion circuitry 302 and the weld power conversion circuitry 304 to be off at a given time. For example, the control circuitry 56 may control the weld power conversion circuitry 304 to output welding-type current for a first welding operation, or a first portion of a welding operation, and then control both of the preheat power conversion circuitry 302 and the weld power conversion circuitry 304 to perform a second welding operation, or a second portion of a welding operation, using both welding a preheating power.

In some examples, the control circuitry 56 is configured to adjust control of the weld power conversion circuitry to adjust the welding output 316 based on the preheating output, such as to maintain a consistent heat input to the weld and/or increase deposition. For example, the control circuitry 56 may decrease the weld output 316 (e.g., weld voltage and/or the weld current) via the weld power conversion circuitry 304 based on controlling the preheat power conversion circuitry 302 to increase in the preheat output 314.

FIG. 3*b* is a block diagram of example power conversion circuitry 320 that may be used to implement the power conversion circuitry 58 of FIG. 2 to convert input welding-type power to output the welding-type output 316 and the preheating output 314. The example power conversion circuitry 320 of FIG. 3*b* includes preheat power conversion circuitry 322 and weld power conversion circuitry 324. In contrast with the example power conversion circuitry 300 of FIG. 3*a*, the preheat power conversion circuitry 322 and weld power conversion circuitry 324 receive a bus voltage from a shared boost converter 308 instead of receiving the welding-type input power 306 as an input.

The preheat power conversion circuitry 322 and weld power conversion circuitry 324 are both coupled to a bus voltage that is output by the boost converter 308, which converts the welding-type input power 306 to the bus voltage. In the example of FIG. 3*b*, the bus capacitor(s) 310 are also shared between the preheat power conversion circuitry 322 and weld power conversion circuitry 324, although each of the preheat power conversion circuitry 322 and weld power conversion circuitry 324 may have respective bus capacitors 310. The example buck converters 312*a*,

312*b* convert the bus voltage to a desired output. The example control circuitry 56 of FIG. 2 controls the boost converter 308 and the buck converters 312*a*, 312*b* to output the preheating output 314 and/or the welding output 316.

While the examples of FIGS. 1, 2, 3*a*, and 3*b* are disclosed above with reference to a preheating wire feeder, other types of welding accessories may also be used. For example, welding pendants may be configured to include the power conversion circuitry disclosed herein to provide welding power and preheating power based on input welding-type power, and used in conjunction with a conventional wire feeder to provide welding and preheating power to a welding torch.

Furthermore, while the foregoing examples are described with reference to resistively preheating a wire at a welding torch, the disclosed examples may also be used in conjunction with other forms of wire heating, such as inductive heating of the wire, hotwire techniques, arc-based preheating in which an electrical arc is used to apply heat to the wire prior to the welding arc, laser-based preheating, radiant heating, convective heating, and/or any other forms of wire heating.

Figure 4:
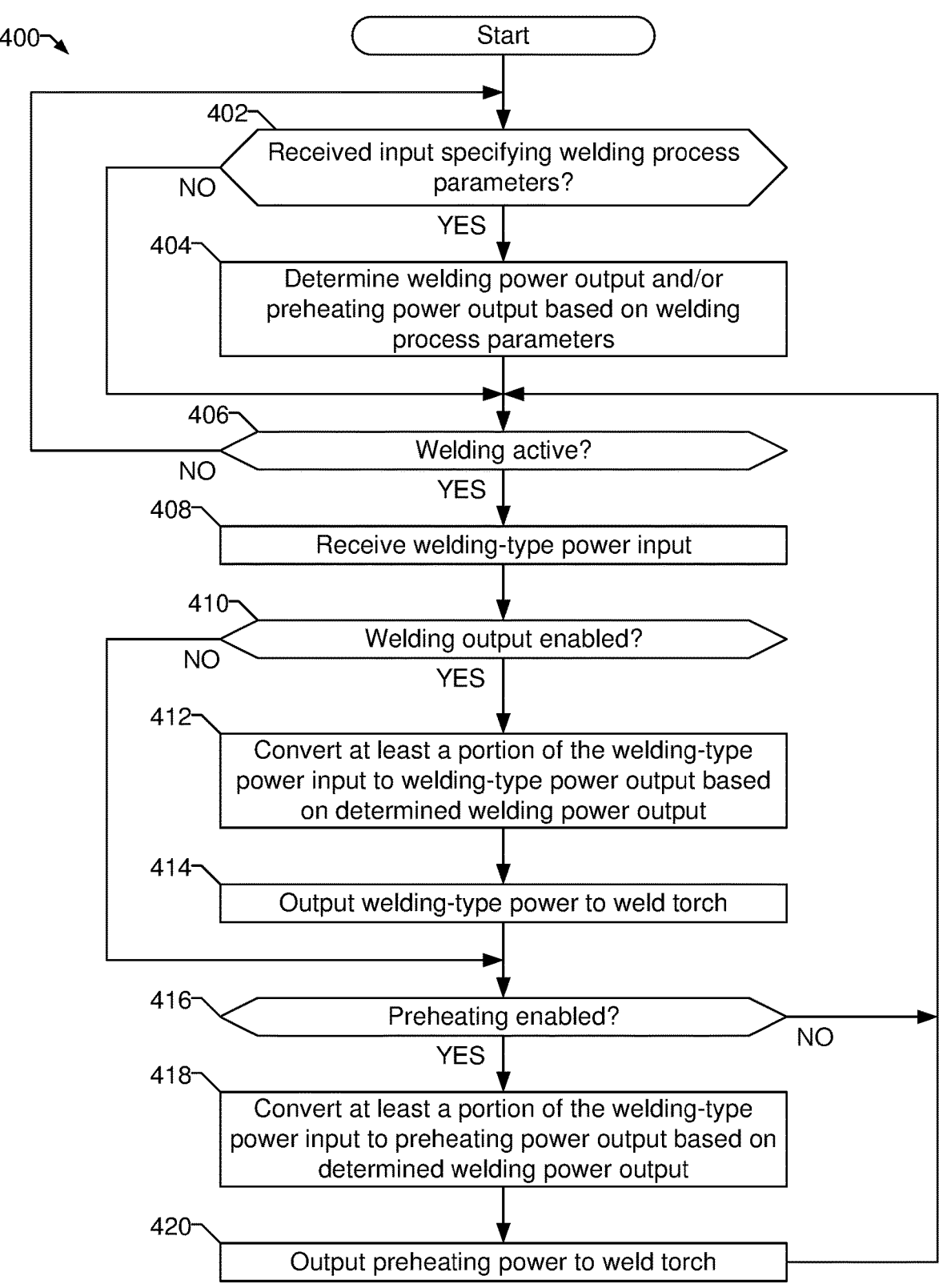
FIG. 4 is a flowchart representative of example machine readable instructions which may be executed by the example welding accessory of FIGS. 1 or FIG. 2 to convert welding-type power to welding-type power and preheating power.

FIG. 4 is a flowchart representative of example machine readable instructions 400 which may be executed by control circuitry of the example preheating wire feeder 16 of FIG. 1, or another welding accessory, to convert welding-type power to welding-type power and preheating power. The example instructions 400 are described below with reference to the preheating wire feeder 16 of FIG. 2, and the example power conversion circuitry 300 of FIG. 3*a*. However, the instructions 400 may be executed using other implementations of the preheating wire feeder 16, the power conversion circuitry 58, and/or other welding accessories.

At block 402, the control circuitry 56 determines whether an input specifying welding process parameter(s) has been received. For example, the control circuitry 56 may receive input(s) specifying any one or more of the welding process parameter comprises at least one of a workpiece thickness, a workpiece material, a wire material, a wire type, a wire diameter, a gas type, or a total heat input limit. Additionally or alternatively, the control circuitry 32 may receive welding parameters (e.g., welding voltage, welding current, wire feed speed, pulse parameters, welding gas flow, etc.), preheating parameters (e.g., preheating voltage, preheating current, preheating temperature, preheating resistance, preheating heat input), total heat input, and/or any other parameters as inputs. The control circuitry 56 may receive the inputs via the user interface 66 and/or via the communications circuitry 70 of FIG. 2.

If an input has been received (block 402), at block 404 the control circuitry 56 determines a welding power output and/or a preheating power output based on the received welding process parameters. For example, the control circuitry 32 may determine one or more of a weld voltage, a weld current, a wire feed speed, an inductance, a weld pulse width, a relative pulse amplitude, a wave shape, a preheating voltage, a preheating current, a preheating pulse, a preheating resistance, a preheating energy input, and/or any other welding power parameter and/or preheating power parameter.

After determining the welding power output and/or the preheating power output (block 404), or if no input has been received (block 402), at block 406 the control circuitry 56 determines whether welding is active. For example, the control circuitry 56 may determine whether a trigger is depressed on the welding torch 14 and/or whether welding-type power is available at an input to the power conversion circuitry 58. If welding is not active (block 406), control returns to block 402 to await an input.

When welding is active (block 406), at block 408 the power conversion circuitry 58 receives the welding-type power input (e.g., from the power source 12 of FIG. 1, via the terminals 40). At block 410, the control circuitry 56 determines whether a welding output is enabled (e.g., based on the welding process parameters). If the welding output is enabled (block 410), at block 412 the power conversion circuitry 58 converts at least a portion of the welding-type power input to a welding-type power output based on the determined welding power output. For example, the control circuitry 56 may control the weld power conversion circuitry 304, the boost converter 308*b*, and/or the buck converter 312*b* of FIG. 3*a*, to convert the input power 306 to the welding output 316.

At block 414, the power conversion circuitry 58 outputs the welding-type power to the weld torch 14. For example, the weld output 316 is conducted to the contact tip 18 and the work cable 42 for generation of the arc 26.

After outputting the welding-type power (block 414), or if the welding output is disabled (block 410), at block 416 the control circuitry 56 determines whether preheating is enabled (e.g., based on the welding process parameters). For example, the control circuitry 56 may selectively enable the preheat power conversion circuitry 302 to provide the preheating output 314 and to selectively disable the second power conversion circuitry 302 to stop the preheating output 314. The control circuitry 56 may enable and/or disable the preheating based on, for example, a user input via the user interface 66, and/or an input from the power source, a remote control, and/or the welding torch 14, via the communications circuitry 70.

If the preheating output is enabled (block 416), at block 418 the power conversion circuitry 58 converts at least a portion of the welding-type power input to a preheating power output based on the determined preheating power output. For example, the control circuitry 56 may control the preheat power conversion circuitry 302, the boost converter 308*a*, and/or the buck converter 312*a* of FIG. 3*a*, to convert the input power 306 to the preheating output 314.

At block 420, the power conversion circuitry 58 outputs the welding-type power to the weld torch 14. For example, the preheating output 314 is conducted to the contact tip 18 and the contact tip 20 via the cables 104, 106.

After outputting the preheating power (block 420), or if the preheating is disabled (block 416), control returns to block 406 to determine whether welding is still active.

Figure 5:
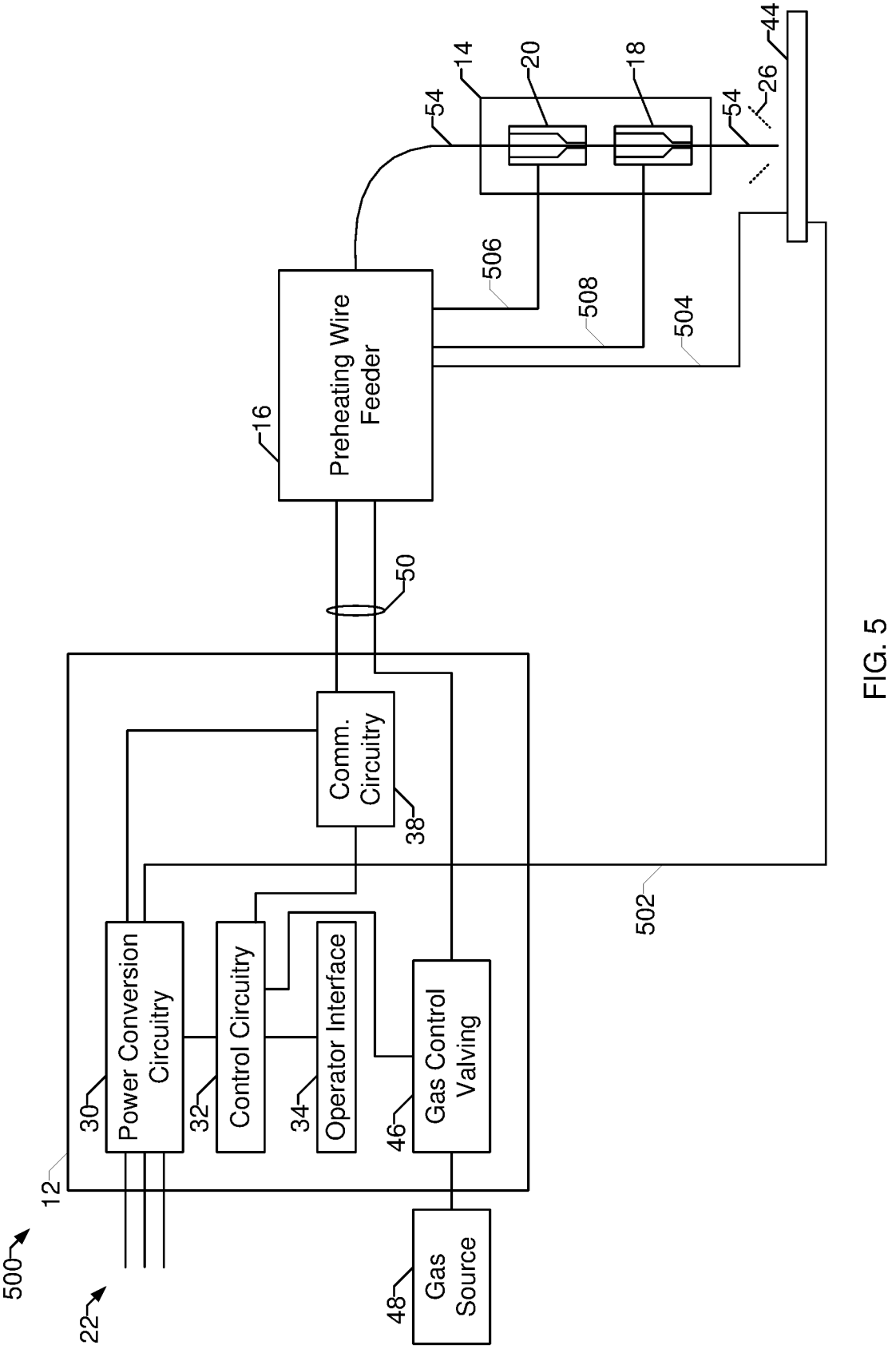
FIG. 5 illustrates another example welding system configured to transfer welding-type power to a welding accessory, such as the preheating wire feeder, for conversion to welding-type output power and resistive preheating power, in accordance with aspects of this disclosure.

FIG. 5 illustrates another example welding system 500 configured to transfer welding-type power to a welding accessory, such as the preheating wire feeder 16, for conversion to welding-type output power and resistive preheating power, in accordance with aspects of this disclosure. The example system 500 of FIG. 5 is similar to the example welding system 10 of FIG. 1, in that the power source 12 provides welding-type power to the preheating wire feeder 16, which converts at least a portion of the welding-type power to preheating power for output to the welding torch 14.

Instead of providing the welding-type power directly to the preheating wire feeder 16 via the two conductors as in the example system 10 of FIG. 1, the example preheating wire feeder 16 is coupled to the power source 12 via one conductor (e.g., via a positive or negative connection) in a manner similar to a conventional voltage sensing wire feeder. The power source 12 is coupled to the workpiece 44 via a work cable 502 to enable the completion of the weld circuit.

To provide communications, voltage sensing, and/or preheating power, the preheating wire feeder is also coupled to the workpiece 44 via a voltage sense lead 504. Because the voltage sense lead 504 is not part of the weld circuit and does not conduct weld current, the voltage sense lead 504 may be designed to conduct less current than the work cables 42, 502. However, the voltage sense lead 504 is configured to withstand sufficient current to provide power to preheating power conversion circuitry, communications circuitry, control circuitry, and/or wire feeding hardware. The example preheating wire feeder 16 converts at least a portion of the power received from the power source 12 to preheating power. The preheating wire feeder 16 outputs the preheating power to the first and second contact tips 18, 20 via conductors 506, 508, and is further configured to pass welding-type power through to the first contact tip 18 to generate the welding arc 26 via the conductor 508 and/or a separate conductor and/or cable. One or more of the conductors 506, 508 carrying preheating and/or welding current may be combined into a cable with the wire liner conducting the welding wire 54, and/or with a gas line conducting shielding gas to the welding torch 14.

Figure 6:
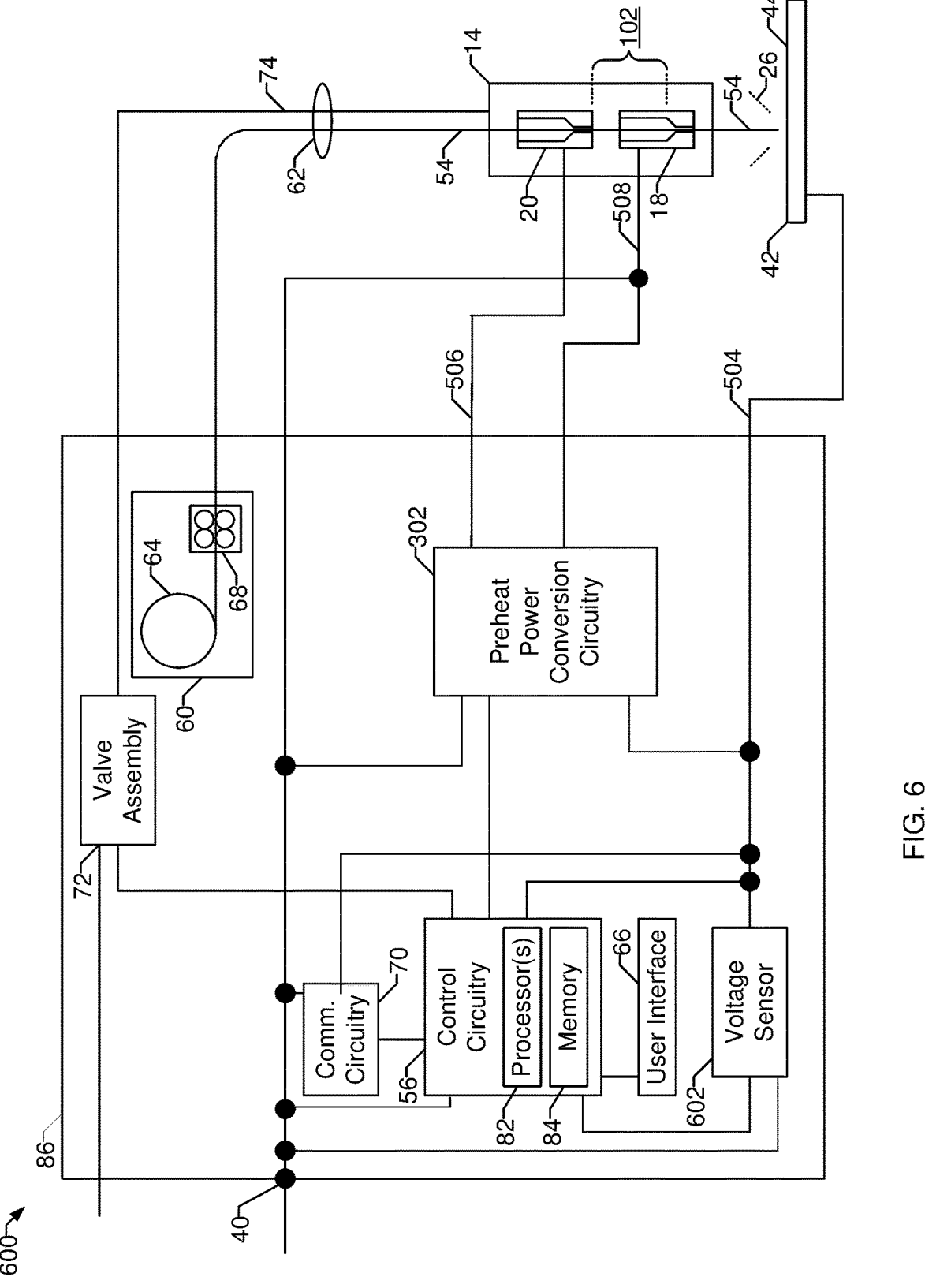
FIG. 6 is a block diagram of another example preheating wire feeder that may be used to implement the preheating wire feeder of FIG. 5.

While the example voltage sense lead 504 is illustrated in FIGS. 5 and 6 as providing a connection for measuring voltage with reference to the workpiece 44, the voltage sense lead 504 may have any other purpose (e.g., providing power to drive the wire feed assembly 60, the control circuitry 56, and/or the communications circuitry), or no other purpose other than to couple the power conversion circuitry 302 to the workpiece 44 to close a power supply circuit to the power source 12. Such conductors or leads may be conventionally referred to as voltage sense leads, or the like, in relevant fields of use. Other example conductors that may be used include a conventional control cable that couples the wire feeder 16 to the power source 12 (e.g., via a 14-pin connector on the power source 12).

FIG. 6 is a block diagram of another example preheating wire feeder 600 that may be used to implement the preheating wire feeder 16 of FIG. 5. The example preheating wire feeder 600 includes the control circuitry 56, the wire feed assembly 60, the user interface 66, the communications circuitry 70, and the valve assembly 72 of FIG. 2. However, one or more of those components may be omitted, replaced, and/or otherwise modified from the examples disclosed herein.

The example preheating wire feeder 600 is configured to receive welding-type power as an input from the power source 12 via a terminal 40. The welding-type power is passed through to the first contact tip 18 of the welding torch 14. In some examples, the preheating wire feeder 600 includes a contactor configured to connect and disconnect the welding-type power input from the welding-type power output. For example, the control circuitry 56 may control a contactor to connect or disconnect the input from the output based on whether welding-type power and/or wire feeding is to be performed.

The preheating wire feeder 600 includes a voltage sensor 602 configured to measure a voltage across the welding arc 26 during welding, which can provide a more accurate weld voltage feedback for arc control purposes. The preheating wire feeder 600 is coupled to the welding-type output, and is connected to the workpiece 42 via the voltage sense lead 504.

The example preheating wire feeder 600 includes the example preheat power conversion circuitry 302 of FIG. 3a, but may include other types of preheat power conversion circuitry as disclosed herein. The preheat power conversion circuitry 600 is coupled to the welding-type input to receive at least a portion of the welding-type input power. To complete the input circuit power, the example preheat power conversion circuitry 302 is further coupled to the voltage sense lead 504, which is coupled to the power source 12 via the workpiece 44 and the work cable 502 of FIG. 5.

As disclosed above, the example preheating power conversion circuitry 302 converts the input welding-type power (e.g., DC power) to preheating power 314, which is output to the contact tips 18, 20 in the welding torch 14.

Figure 7:
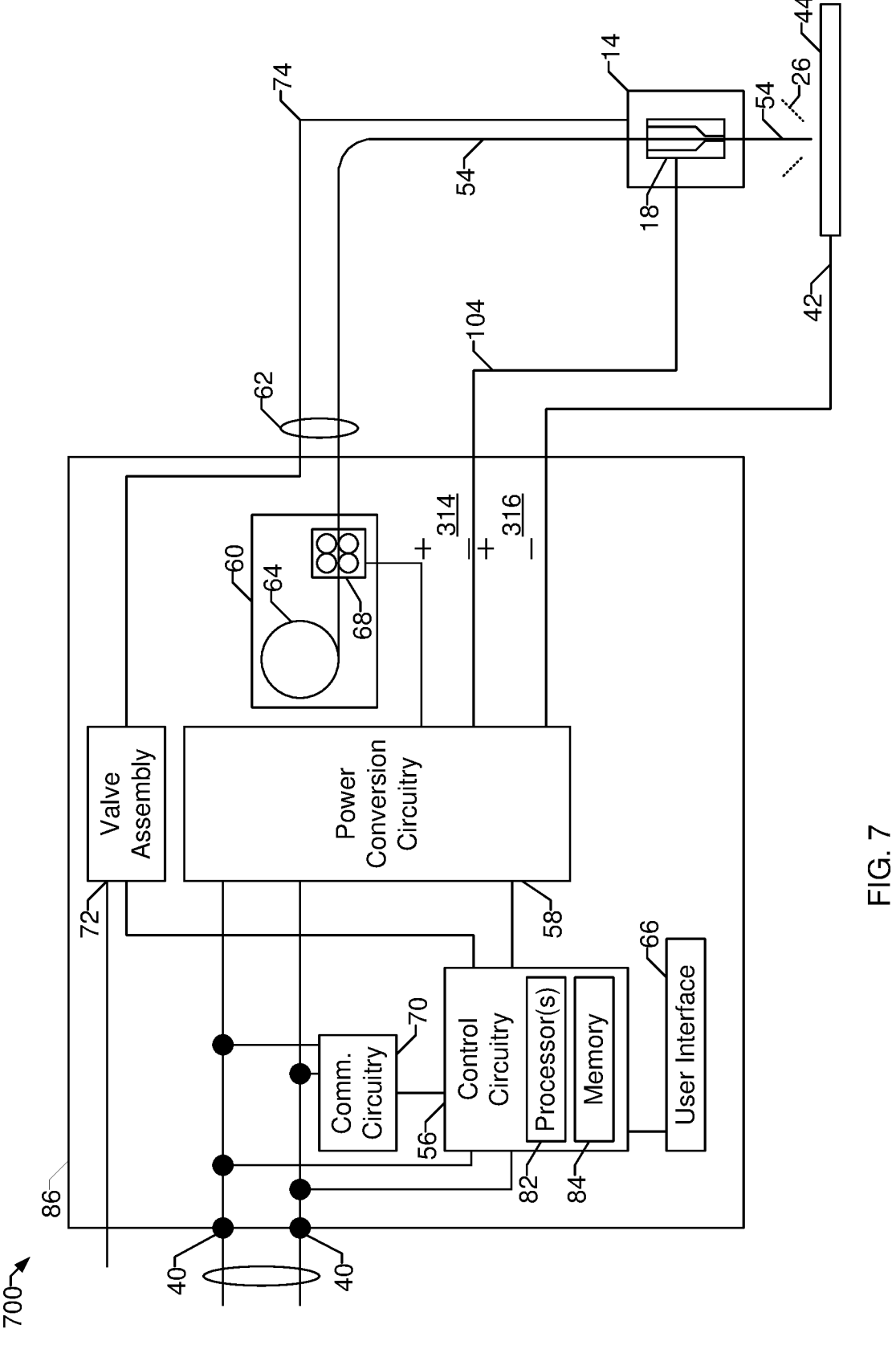
FIG. 7 is a block diagram of another example preheating wire feeder that may be used to implement the preheating wire feeder of FIG. 1.

FIG. 7 is a block diagram of another example preheating wire feeder 700 that may be used to implement the preheating wire feeder 16 of FIG. 1. The example preheating wire feeder 700 includes the terminals 40, the control circuitry 56, the wire feed assembly 60, the power conversion circuitry 58, the user interface 66, the communications circuitry 70, and the valve assembly 72 of FIG. 2. However, one or more of those components may be omitted, replaced, and/or otherwise modified from the examples disclosed herein.

In the example of FIG. 7, the preheating wire feeder 700 is configured to output welding-type power and providing preheating power to a welding wire 54 via a welding torch 14 having only the first contact tip 18 within a body of the housing (e.g., the portion of the welding torch 14 that is held and/or manipulated during a welding operation to position and/or direct the arc 26). Instead of including the second contact tip 20, the example power conversion circuitry 58 is coupled to the wire feed assembly 60 for delivery of the preheating output 314 to the welding wire 54.

The power conversion circuitry 58 supplies the preheating output 314 to the welding wire 54 between the contact tip 18 and the wire feed assembly 60 (e.g., via conductive rollers in the wire feed assembly 60, and/or via a contact element in the preheating wire feeder). The power conversion circuitry 58 may provide a relatively low preheat current due to the time required for the welding wire 54 to traverse the distance from the power conversion circuitry 58 (or contact element) in the wire feeder 600 and the contact tip 18, to avoid melting the welding wire 54 or causing buckling due to reduction in column strength of the welding wire 54.

The example wire feeder 600 of FIG. 6 may be similarly configured, such that the preheat power conversion circuitry 302 outputs the preheating output 314 via the wire feed assembly 60 when using a welding torch 14 having a single contact tip 14.

By extending the length over which the welding wire 54 is preheated, the example wire feeder 700 of FIG. 7 further increases the hydrogen that is removed from the welding wire 54 prior to reaching the welding arc 26. The use of a welding torch 14 having a single contact tip 14 reduces the weight and size of the welding torch 14 relative to a torch using multiple contact tips.

Figure 8:
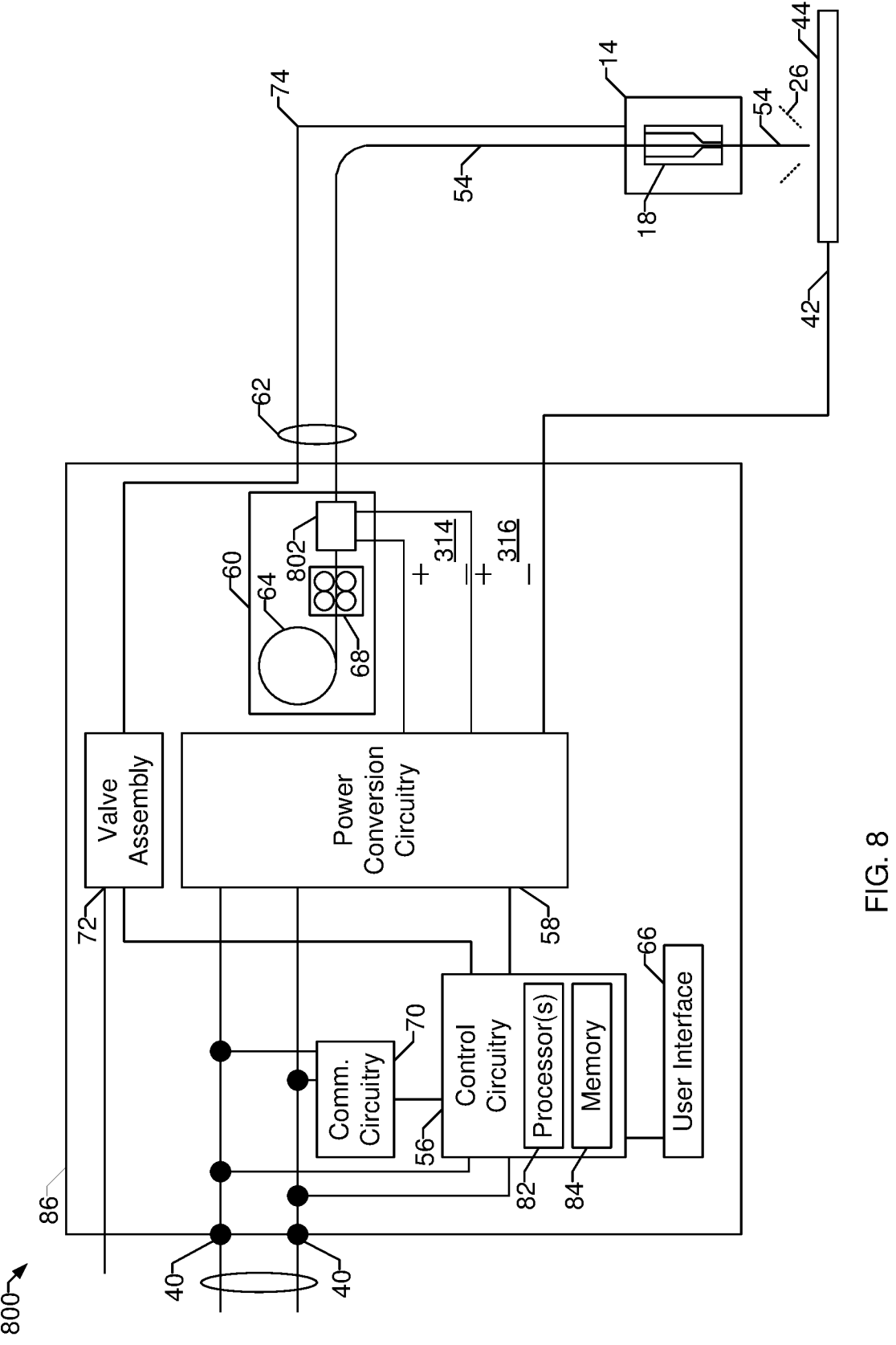
FIG. 8 is a block diagram of another example preheating wire feeder that may be used to implement the preheating wire feeder of FIG. 1.

FIG. 8 is a block diagram of another example preheating wire feeder 800 that may be used to implement the preheating wire feeder 16 of FIG. 1. The example preheating wire feeder 800 includes the terminals 40, the control circuitry 56, the wire feed assembly 60, the power conversion circuitry 58, the user interface 66, the communications circuitry 70, and the valve assembly 72 of FIG. 2. However, one or more of those components may be omitted, replaced, and/or otherwise modified from the examples disclosed herein.

In the example of FIG. 8, the power conversion circuitry 58 outputs the preheating output 314 to a wire preheater 802 within the housing 86, such as within the wire feed assembly 60. The example wire preheater 802 may provide any of resistive preheating (e.g., via two contact points on the welding wire 54), inductive heating of the welding wire 54 (e.g., via routing the welding wire 54 through or near an induction coil), arc-based preheating (e.g., via one or more tungsten electrodes configured to establish an electrical arc to the welding wire 54), laser-based preheating (e.g., via a laser configured to output energy to the welding wire 54), radiant heating (e.g., via heating coils not in contact with the welding wire 54 but configured to heat the welding wire 54 via radiation), convective heating (e.g., via heating coils, ceramic, or other heated material configured to contact the welding wire 54 to transfer heat to the welding wire 54), and/or any other preheating technique. In operation, the example preheating wire feeder 800 preheats the welding wire 54 via the wire preheater 802. The example control circuitry 56 may control the power conversion circuitry 58 as described above with reference to FIG. 4.

By performing preheating at the preheating wire feeder 800, a standard welding torch may be used by the operator, rather than a torch that includes preheating and/or liquid-cooling apparatus. Thus, performing preheating at the preheating wire feeder 800 may reduce bulk of the torch to be held and manipulated by the operator.

While an example preheating wire feeder 800 is illustrated as including the wire preheater 802, any of the other preheating wire feeders disclosed herein (e.g., wire feeders using a volt sense lead, using a control cable, etc. to obtain the welding-type power from the power source 12) may be modified to include the wire preheater 802.

In other examples, other types of wire preheaters may be included in the preheating torch 14. For example, FIG. 9 is a block diagram of an example preheating wire feeder 900 that may be used to implement the preheating wire feeder 16 of FIG. 1 to provide preheating power to a wire preheater 902 in the torch 14.

Figure 9:
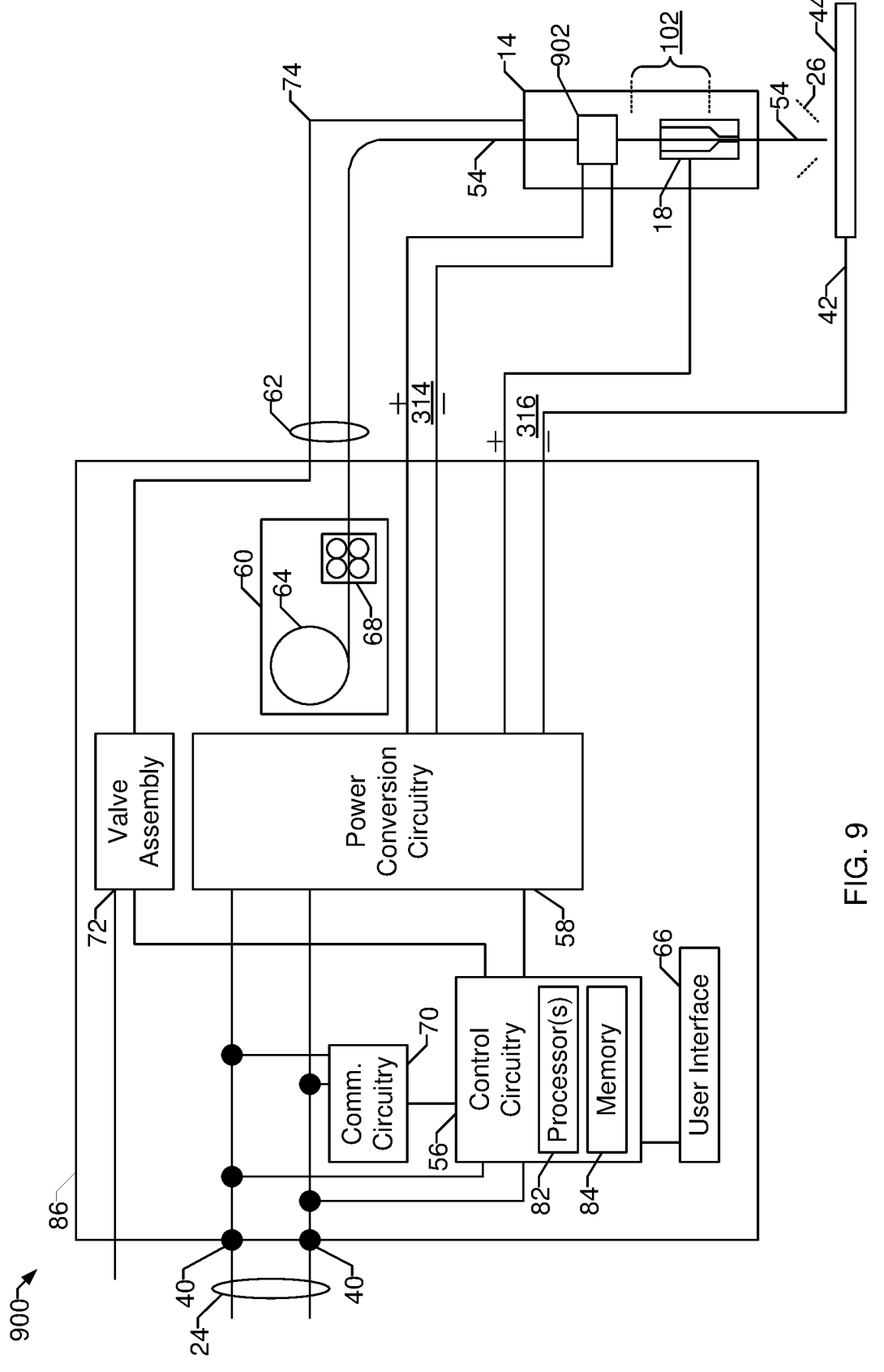
FIG. 9 is a block diagram of another example preheating wire feeder that may be used to implement the preheating wire feeder of FIG. 1.

In the example of FIG. 9, the power conversion circuitry 58 outputs the preheating output 314 to the wire preheater 902 within the torch 14. The example wire preheater 902 may provide any of inductive heating of the welding wire 54 (e.g., via routing the welding wire 54 through or near an induction coil), arc-based preheating (e.g., via one or more tungsten electrodes configured to establish an electrical arc to the welding wire 54), laser-based preheating, radiant heating, convective heating, and/or any other preheating technique. In operation, the example preheating wire feeder 900 preheats the welding wire 54 via the wire preheater 902. The example control circuitry 56 may control the power conversion circuitry 58 as described above with reference to FIG. 4.

In some other examples, the wire preheater 902 may be located in (e.g., integrated with or attached to) the cable whip attaching the torch 14 to the wire feeder 16. For example, the cable may be provided with a housing partway along the cable whip, far enough away from the torch body (e.g., the handheld portion of the torch 14) so that the mass of the wire preheater 902 does not substantially affect the manipulation of the torch 14 by the operator during welding operations.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding accessory configured to receive first DC welding-type power from a welding power source and comprising:
a weld input configured to receive the first DC welding-type power from the welding power source; and
power conversion circuitry configured to:
convert a first portion of the first DC welding-type power received from the welding power source to second DC welding-type power having a welding voltage;
output the second DC welding-type power to a weld circuit portion of a welding torch;
convert a second portion of the first DC welding-type power received from the welding power source to preheating power having a preheating voltage different than the welding voltage; and
output the preheating power at the preheating voltage to a preheater portion of the welding torch.

2. The welding accessory as defined in claim 1, wherein the power conversion circuitry comprises:

first power conversion circuitry configured to convert the first portion of the first DC welding-type power to the second DC welding-type power; and
second power conversion circuitry configured to convert the second portion of the first DC welding-type power to the preheating power.

3. The welding accessory as defined in claim 2, further comprising a housing configured to enclose the first power conversion circuitry and the second power conversion circuitry.

4. The welding accessory as defined in claim 2, wherein the first power conversion circuitry and the second power conversion circuitry are configured to output the second DC welding-type power and the preheating power to the welding torch via a same cable.

5. The welding accessory as defined in claim 2, wherein the first power conversion circuitry comprises a first switched-mode power supply and the second power conversion circuitry comprises a second switched-mode power supply.

6. The welding accessory as defined in claim 1, further comprising control circuitry configured to selectively enable the power conversion circuitry to provide the preheating power and to selectively disable the power conversion circuitry to stop the preheating power.

7. The welding accessory as defined in claim 6, wherein the control circuitry is configured to selectively enable or disable the power conversion circuitry based on a user input.

8. The welding accessory as defined in claim 7, further comprising communications circuitry configured to receive the user input from at least one of a welding torch coupled to a wire feeder or a pendant.

9. The welding-accessory as defined in claim 7, further comprising a user interface configured to receive a user input, wherein the control circuitry is configured to control the power conversion circuitry based on the user input.

10. The welding accessory as defined in claim 1, further comprising control circuitry configured to control electrical parameters of the power conversion circuitry based on the preheating power applied to an electrode wire.

11. The welding accessory as defined in claim 1, further comprising control circuitry configured to control the power conversion circuitry using a voltage-controlled control loop.

12. The welding accessory as defined in claim 1, further comprising communication circuitry configured to communicate with a welding-type power supply from which the weld input receives the first DC welding-type power.

13. The welding accessory as defined in claim 12, wherein the communication circuitry is configured to transmit electrical parameters to the welding-type power supply based on at least one of the second DC welding-type power or the preheating power.

14. The welding accessory as defined in claim 1, wherein the weld input comprises one terminal configured to be coupled to a weld cable, wherein the power conversion circuitry is configured to output the second DC welding-type power to the weld circuit via one output and to be coupled to a workpiece via a volt sense cable.

15. The welding accessory as defined in claim 1, wherein the weld input comprises two or more terminals coupled to two or more cables to receive the first DC welding-type power, wherein the power conversion circuitry is configured to output the second DC welding-type power to the weld circuit via two or more output terminals.

16. The welding accessory as defined in claim 1, wherein the first DC welding-type power comprises direct current power output by a welding-type power supply.

17. The welding accessory as defined in claim 1, further comprising a wire drive configured to feed an electrode wire toward a welding torch.

18. The welding accessory as defined in claim 1, wherein the welding accessory is a wire feeder or a pendant.

19. The welding accessory as defined in claim 1, wherein the preheater comprises at least one of: a preheating circuit including a portion of an electrode wire located between a first contact point and a second contact point; an induction coil configured to heat the electrode wire; a tungsten electrode configured to establish an arc to the electrode wire; a laser configured to output energy to the electrode wire; a heating coil configured to heat the electrode wire via radiation; or a convective heating material configured to contact the electrode wire to transfer heat to the electrode wire.

20. A welding system, comprising:
first power conversion circuitry configured to convert power to first DC welding-type power;
second power conversion circuitry configured to:
convert a first portion of the first DC welding-type power to second DC welding-type power; and
output the second welding-type power to a weld circuit;
third power conversion circuitry configured to:
convert a second portion of the first DC welding-type power to preheating power concurrently with the conversion of the first portion of the first DC welding-type power to the second DC welding-type power; and
output the preheating power to a preheater; and
control circuitry configured to control the second power conversion circuitry and the third power conversion circuitry.

21. A welding accessory configured to convert first DC welding-type power to second DC welding-type power and preheating power, and comprising:
a weld input configured to receive the first DC welding-type power from a welding power source; and
power conversion circuitry configured to:
convert a first portion of the first DC welding-type power received from the welding power source to the second DC welding-type power;
output the second DC welding-type power to a welding torch via a first output terminal;
convert a second portion of the first DC welding-type power received from the power supply to the preheating power; and
output the preheating power via a second output terminal to a preheater portion of the welding torch.

* * * * *